US012597983B2

(12) United States Patent
Ryu et al.

(10) Patent No.: US 12,597,983 B2
(45) Date of Patent: Apr. 7, 2026

(54) INTER-USER EQUIPMENT COORDINATION FOR RESOURCE MANAGEMENT

(71) Applicant: QUALCOMM Incorporated, San Diego, CA (US)

(72) Inventors: Jung Ho Ryu, Fort Lee, NJ (US); Sony Akkarakaran, Poway, CA (US); Hua Wang, Basking Ridge, NJ (US); Gabi Sarkis, San Diego, CA (US); Tao Luo, San Diego, CA (US); Junyi Li, Fairless Hills, PA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 17/943,157

(22) Filed: Sep. 12, 2022

(65) Prior Publication Data

US 2024/0088986 A1     Mar. 14, 2024

(51) Int. Cl.
H04B 7/08          (2006.01)
H04W 56/00         (2009.01)
(Continued)

(52) U.S. Cl.
CPC .......... H04B 7/088 (2013.01); H04W 56/001 (2013.01); H04W 74/0841 (2013.01); H04W 76/19 (2018.02)

(58) Field of Classification Search
CPC ........... H04W 56/001; H04W 74/0841; H04W 76/19; H04W 40/22; H04B 7/088; H04B 7/06954
See application file for complete search history.

(56) References Cited

U.S. PATENT DOCUMENTS 12,069,664 B2 *   8/2024  Hui ......................... H04W 4/70
2021/0100059 A1 *  4/2021  Xu ..................... H04B 7/06954
(Continued)

FOREIGN PATENT DOCUMENTS

WO     WO-2021207459 A1     10/2021
WO     WO-2023205231 A1 *   10/2023   ............ H04W 92/18

OTHER PUBLICATIONS

International Search Report and Written Opinion—PCT/US2023/072316—ISA/EPO—Oct. 26, 2023 (2204851WO).

*Primary Examiner* — Rasheed Gidado
(74) *Attorney, Agent, or Firm* — Holland & Hart LLP

(57)                    ABSTRACT

Methods, systems, and devices for wireless communications are described. A receiving user equipment (UE) may broadcast messages containing inter-UE cooperation (IUC) information using multiple beams. The IUC information transmitted on each beam may be different for each beam of the receiving UE. For example, each IUC information may contain different preferred resources or non-preferred resources for the receiving UE to receive a transmission from a transmitting UE. The transmitting UE may receive a message containing IUC information from one of the beams of the receiving UE and transmit a signal using resources based on the IUC information contained in the received message. In some examples, the transmitting UE may transmit a channel busy ratio (CBR) request to a receiving UE. The CBR request may specify a transmission configuration indicator (TCI) state, spatial relation, spatial domain filter, or beam according to which the receiving UE is to measure the CBR.

29 Claims, 12 Drawing Sheets

(51) Int. Cl.
 H04W 74/08       (2024.01)
 H04W 74/0833     (2024.01)
 H04W 76/19       (2018.01)

(56)              References Cited

U.S. PATENT DOCUMENTS

| | | | |
|---|---|---|---|
| 2021/0274506 A1 | 9/2021 | Raghavan et al. | |
| 2022/0006505 A1* | 1/2022 | Ryu | H04W 74/0841 |
| 2022/0046602 A1* | 2/2022 | Hosseini | H04W 72/56 |
| 2022/0095257 A1* | 3/2022 | Castaneda | H04W 16/26 |
| 2022/0399927 A1* | 12/2022 | Tsai | H04B 7/0617 |
| 2023/0389051 A1* | 11/2023 | Leon Calvo | H04W 72/25 |
| 2024/0015755 A1* | 1/2024 | Pan | H04W 72/25 |

\* cited by examiner

305

310-a

305

310-b

300

510

520

515

505

500

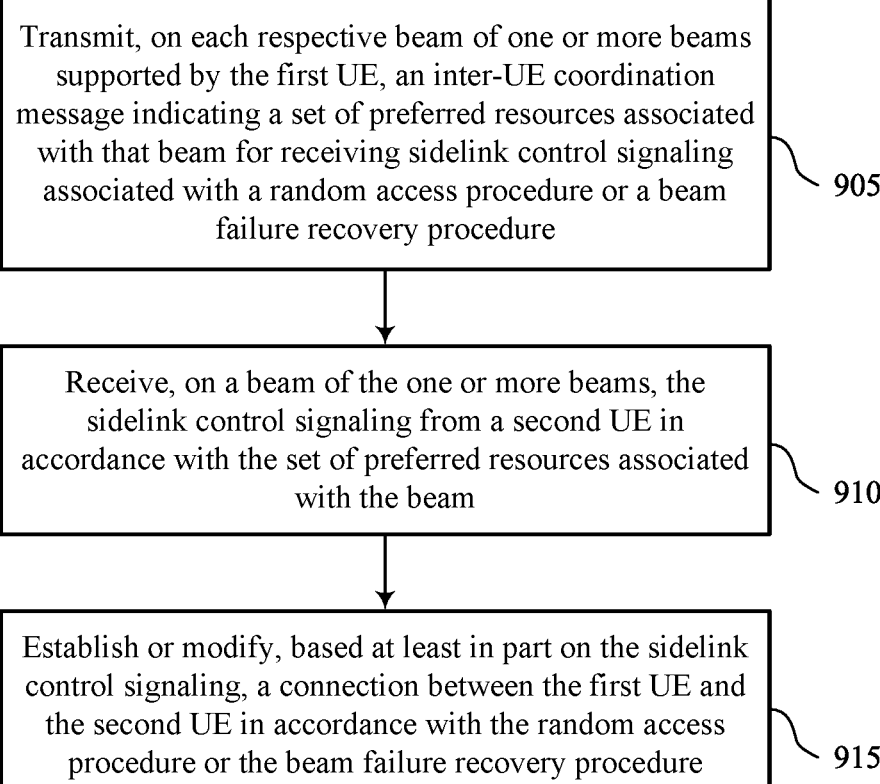

Transmit, on each respective beam of one or more beams supported by the first UE, an inter-UE coordination message indicating a set of preferred resources associated with that beam for receiving sidelink control signaling associated with a random access procedure or a beam failure recovery procedure    905

Receive, on a beam of the one or more beams, the sidelink control signaling from a second UE in accordance with the set of preferred resources associated with the beam    910

Establish or modify, based at least in part on the sidelink control signaling, a connection between the first UE and the second UE in accordance with the random access procedure or the beam failure recovery procedure    915

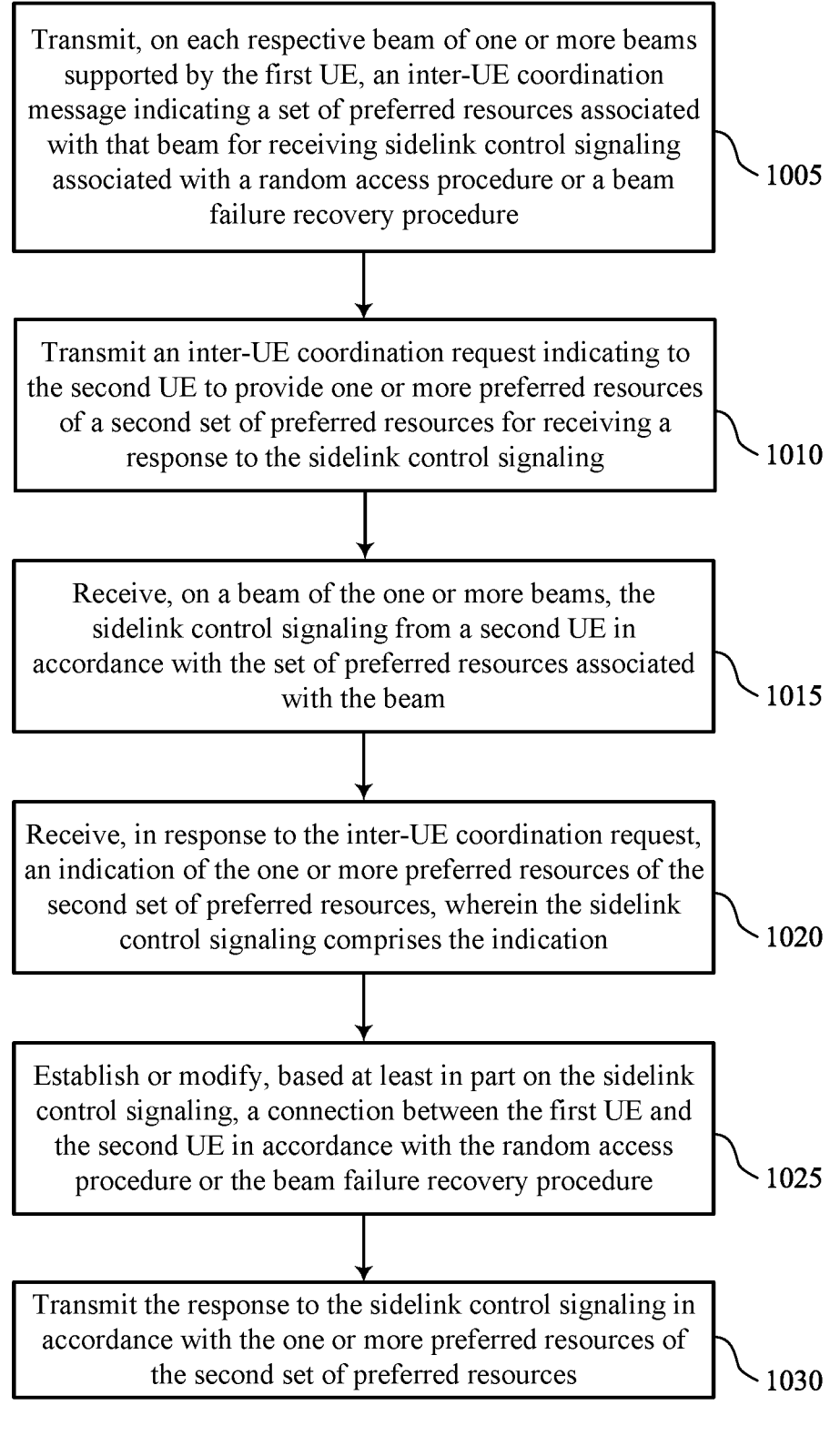

Transmit, on each respective beam of one or more beams supported by the first UE, an inter-UE coordination message indicating a set of preferred resources associated with that beam for receiving sidelink control signaling associated with a random access procedure or a beam failure recovery procedure ⟍ 1005

Transmit an inter-UE coordination request indicating to the second UE to provide one or more preferred resources of a second set of preferred resources for receiving a response to the sidelink control signaling ⟍ 1010

Receive, on a beam of the one or more beams, the sidelink control signaling from a second UE in accordance with the set of preferred resources associated with the beam ⟍ 1015

Receive, in response to the inter-UE coordination request, an indication of the one or more preferred resources of the second set of preferred resources, wherein the sidelink control signaling comprises the indication ⟍ 1020

Establish or modify, based at least in part on the sidelink control signaling, a connection between the first UE and the second UE in accordance with the random access procedure or the beam failure recovery procedure ⟍ 1025

Transmit the response to the sidelink control signaling in accordance with the one or more preferred resources of the second set of preferred resources ⟍ 1030

Figure 11:
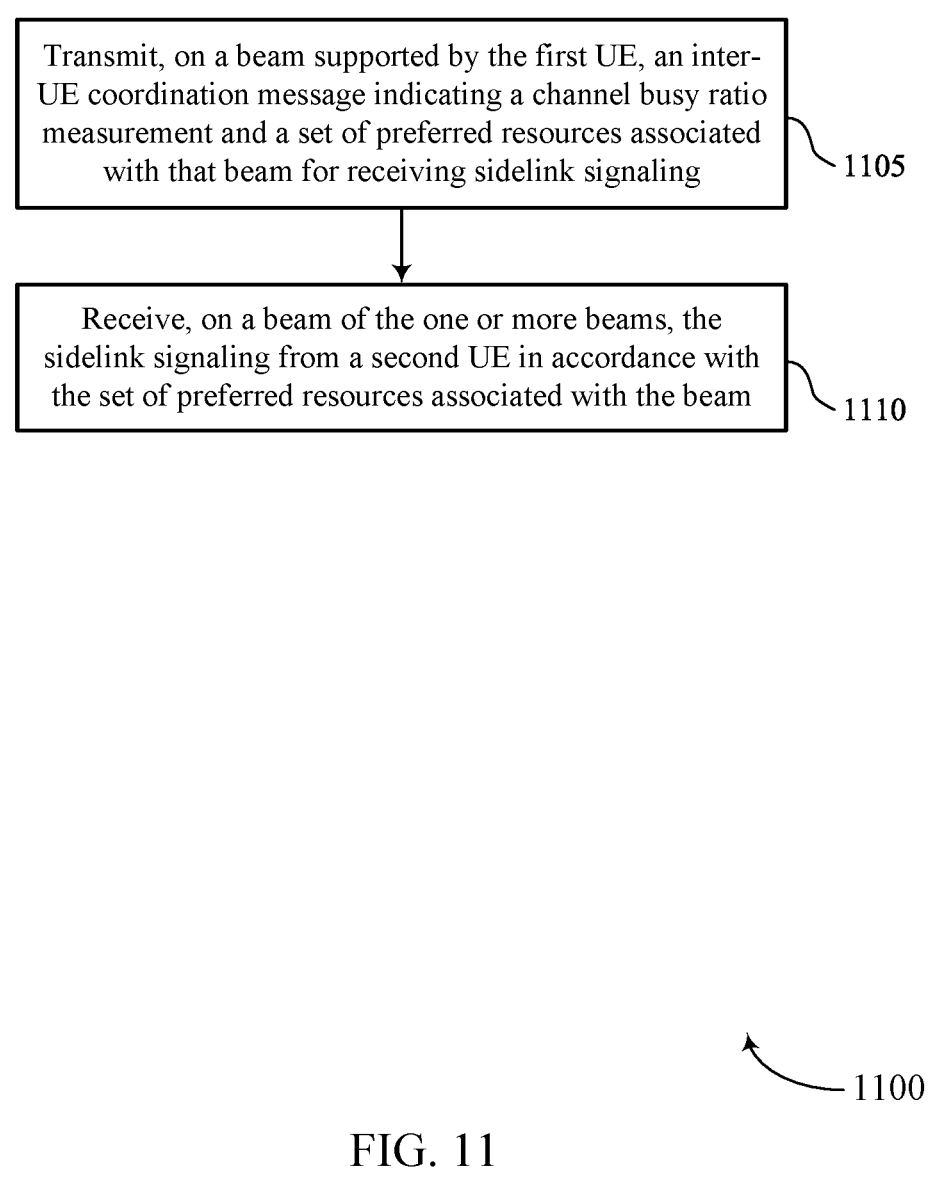

Transmit, on a beam supported by the first UE, an inter-UE coordination message indicating a channel busy ratio measurement and a set of preferred resources associated with that beam for receiving sidelink signaling ⟩ 1105

↓

Receive, on a beam of the one or more beams, the sidelink signaling from a second UE in accordance with the set of preferred resources associated with the beam ⟩ 1110

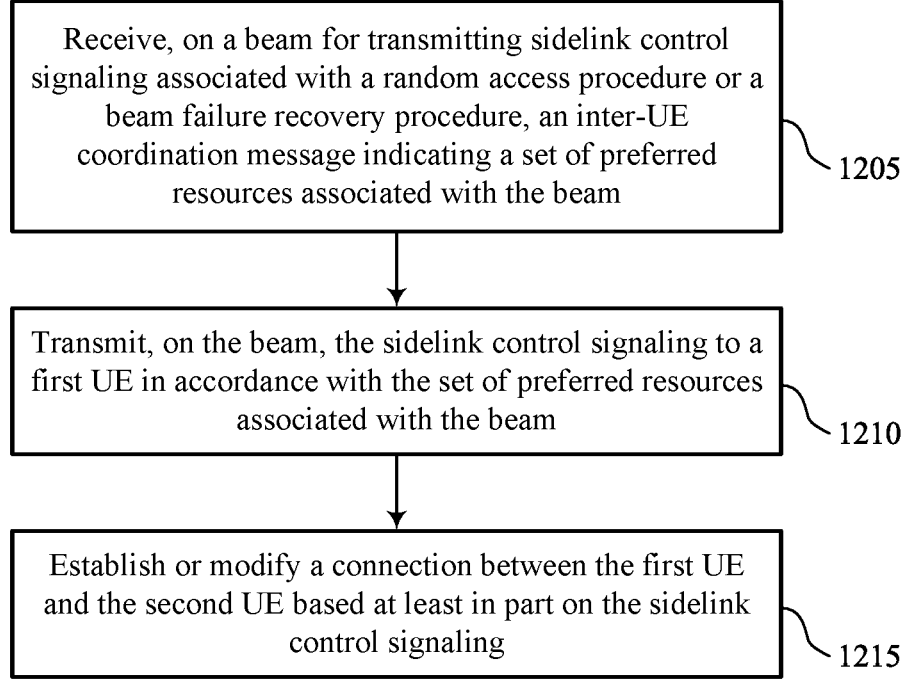

Receive, on a beam for transmitting sidelink control signaling associated with a random access procedure or a beam failure recovery procedure, an inter-UE coordination message indicating a set of preferred resources associated with the beam

1205

Transmit, on the beam, the sidelink control signaling to a first UE in accordance with the set of preferred resources associated with the beam

1210

Establish or modify a connection between the first UE and the second UE based at least in part on the sidelink control signaling

INTER-USER EQUIPMENT COORDINATION FOR RESOURCE MANAGEMENT

FIELD OF TECHNOLOGY

The following relates to wireless communications, including inter-user equipment coordination (IUC) for resource management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A UE may communicate with directly with another UE via sidelink communication, such as by using a device-to-device communication link.

SUMMARY

The described techniques relate to improved methods, systems, devices, and apparatuses that support inter-user equipment coordination (IUC) for resource management. For example, the described techniques provide for a first user equipment (UE) to transmit, on one or more beams supported by the first UE, an IUC message indicating a set of preferred resources associated with that beam for receiving sidelink control signaling associated with a random access procedure or a beam failure recovery procedure. In some cases, the IUC message may include an indication of a channel busy ratio (CBR) measurement. The first UE may receive, on one of the one or more beams, the sidelink control signaling from a second UE according to the set of preferred resources associated with the beam and, in some examples, the CBR measurement. The first UE may establish or modify, based at least in part on the sidelink control signaling, a connection between the first UE and the second UE in accordance with the random access procedure or the beam failure recovery procedure.

An apparatus for wireless communication at a first UE is described. The apparatus may include a processor, memory coupled with the processor, and instructions stored in the memory. The instructions may be executable by the processor to cause the apparatus to transmit, on each respective beam of one or more beams supported by the first UE, an inter-UE coordination message indicating a set of preferred resources associated with that beam for receiving sidelink control signaling associated with a random access procedure or a beam failure recovery procedure, receive, on a beam of the one or more beams, the sidelink control signaling from a second UE in accordance with the set of preferred resources associated with the beam, and establish or modify, based on the sidelink control signaling, a connection between the first UE and the second UE in accordance with the random access procedure or the beam failure recovery procedure.

A method for wireless communication at a first user equipment (UE) is described. The method may include transmitting, on each respective beam of one or more beams supported by the first UE, an inter-UE coordination message indicating a set of preferred resources associated with that beam for receiving sidelink control signaling associated with a random access procedure or a beam failure recovery procedure, receiving, on a beam of the one or more beams, the sidelink control signaling from a second UE in accordance with the set of preferred resources associated with the beam, and establishing or modifying, based on the sidelink control signaling, a connection between the first UE and the second UE in accordance with the random access procedure or the beam failure recovery procedure.

Another apparatus for wireless communication at a first UE is described. The apparatus may include means for transmitting, on each respective beam of one or more beams supported by the first UE, an inter-UE coordination message indicating a set of preferred resources associated with that beam for receiving sidelink control signaling associated with a random access procedure or a beam failure recovery procedure, means for receiving, on a beam of the one or more beams, the sidelink control signaling from a second UE in accordance with the set of preferred resources associated with the beam, and means for establishing or modifying, based on the sidelink control signaling, a connection between the first UE and the second UE in accordance with the random access procedure or the beam failure recovery procedure.

A non-transitory computer-readable medium storing code for wireless communication at a first UE is described. The code may include instructions executable by a processor to transmit, on each respective beam of one or more beams supported by the first UE, an inter-UE coordination message indicating a set of preferred resources associated with that beam for receiving sidelink control signaling associated with a random access procedure or a beam failure recovery procedure, receive, on a beam of the one or more beams, the sidelink control signaling from a second UE in accordance with the set of preferred resources associated with the beam, and establish or modify, based on the sidelink control signaling, a connection between the first UE and the second UE in accordance with the random access procedure or the beam failure recovery procedure.

In some examples of the method, apparatuses, and non-transitory computer-readable medium described herein, transmitting the inter-UE coordination message may include operations, features, means, or instructions for transmitting an inter-UE coordination request indicating to the second UE to provide one or more preferred resources of a second set of preferred resources for receiving a response to the sidelink control signaling.

Some examples of the method, apparatuses, and non-transitory computer-readable medium described herein may further include operations, features, means, or instructions for receiving, in response to the inter-UE coordination request, an indication of the one or more preferred resources of the second set of preferred resources, where the sidelink control signaling includes the indication and transmitting the response to the sidelink control signaling in accordance with the one or more preferred resources of the second set of preferred resources.

In some examples of the method, apparatuses, and non-transitory computer-readable medium described herein, establishing or modifying the connection may include operations, features, means, or instructions for transmitting, in response to the sidelink control signaling, a beam failure recovery response associated with the beam failure recovery procedure or a random access response associated with the random access procedure, where the sidelink control signaling includes a beam failure recovery signal or a random access signal.

Some examples of the method, apparatuses, and non-transitory computer-readable medium described herein may further include operations, features, means, or instructions for receiving a request for the inter-UE coordination message, where transmitting the inter-UE coordination message may be in response to the request.

Some examples of the method, apparatuses, and non-transitory computer-readable medium described herein may further include operations, features, means, or instructions for receiving, from one or more UEs, sidelink control information indicating scheduling information for the one or more UEs, where the inter-UE coordination message indicates an updated set of preferred resources based on the scheduling information for the one or more UEs.

In some examples of the method, apparatuses, and non-transitory computer-readable medium described herein, the inter-UE coordination message may be transmitted to the second UE on the beam in accordance with a spatial filter and receiving the sidelink control signaling may be in accordance with the spatial filter.

In some examples of the method, apparatuses, and non-transitory computer-readable medium described herein, transmitting the inter-UE coordination message may include operations, features, means, or instructions for transmitting, on each respective beam of the set of multiple beams supported by the first UE, synchronization information associated with the first UE, system information associated with the first UE, or both.

An apparatus for wireless communication at a first UE is described. The apparatus may include a processor, memory coupled with the processor, and instructions stored in the memory. The instructions may be executable by the processor to cause the apparatus to transmit, on a beam supported by the first UE, an inter-UE coordination message indicating a channel busy ratio measurement and a set of preferred resources associated with that beam for receiving sidelink signaling and receive, on a beam of the one or more beams, the sidelink signaling from a second UE in accordance with the set of preferred resources associated with the beam.

A method for wireless communication at a first UE is described. The method may include transmitting, on a beam supported by the first UE, an inter-UE coordination message indicating a channel busy ratio measurement and a set of preferred resources associated with that beam for receiving sidelink signaling and receiving, on a beam of the one or more beams, the sidelink signaling from a second UE in accordance with the set of preferred resources associated with the beam.

Another apparatus for wireless communication at a first UE is described. The apparatus may include means for transmitting, on a beam supported by the first UE, an inter-UE coordination message indicating a channel busy ratio measurement and a set of preferred resources associated with that beam for receiving sidelink signaling and means for receiving, on a beam of the one or more beams, the sidelink signaling from a second UE in accordance with the set of preferred resources associated with the beam.

A non-transitory computer-readable medium storing code for wireless communication at a first UE is described. The code may include instructions executable by a processor to transmit, on a beam supported by the first UE, an inter-UE coordination message indicating a channel busy ratio measurement and a set of preferred resources associated with that beam for receiving sidelink signaling and receive, on a beam of the one or more beams, the sidelink signaling from a second UE in accordance with the set of preferred resources associated with the beam.

In some examples of the method, apparatuses, and non-transitory computer-readable medium described herein, the sidelink signaling may be associated with a random access procedure or a beam failure recovery procedure.

In some examples of the method, apparatuses, and non-transitory computer-readable medium described herein, the channel busy ratio measurement may be associated with the one or more beams.

Some examples of the method, apparatuses, and non-transitory computer-readable medium described herein may further include operations, features, means, or instructions for receiving a request for the channel busy ratio measurement, where transmitting the channel busy ratio measurement may be based on the request.

In some examples of the method, apparatuses, and non-transitory computer-readable medium described herein, the request for the channel busy ratio measurement indicates a transmission configuration indicator state for the one or more beams, a spatial relation for the one or more beams, a spatial domain filter for the one or more beams, the one or more beams, or any combination thereof.

Some examples of the method, apparatuses, and non-transitory computer-readable medium described herein may further include operations, features, means, or instructions for receiving a request for the inter-UE coordination message, where transmitting the channel busy ratio measurement may be based on the request.

Some examples of the method, apparatuses, and non-transitory computer-readable medium described herein may further include operations, features, means, or instructions for receiving a data transmission based on one or more transmission parameters corresponding to the channel busy ratio measurement.

Some examples of the method, apparatuses, and non-transitory computer-readable medium described herein may further include operations, features, means, or instructions for performing the channel busy ratio measurement based on the set of preferred resources.

An apparatus for wireless communication a second UE is described. The apparatus may include a processor, memory coupled with the processor, and instructions stored in the memory. The instructions may be executable by the processor to cause the apparatus to receive, on a beam for transmitting sidelink control signaling associated with a random access procedure or a beam failure recovery procedure, an inter-UE coordination message indicating a set of preferred resources associated with the beam, transmit, on the beam, the sidelink control signaling to a first UE in accordance with the set of preferred resources associated with the beam, and establish or modify a connection between the first UE and the second UE based on the sidelink control signaling.

A method for wireless communication a second UE is described. The method may include receiving, on a beam for transmitting sidelink control signaling associated with a random access procedure or a beam failure recovery procedure, an inter-UE coordination message indicating a set of preferred resources associated with the beam, transmitting, on the beam, the sidelink control signaling to a first UE in accordance with the set of preferred resources associated with the beam, and establishing or modifying a connection between the first UE and the second UE based on the sidelink control signaling.

Another apparatus for wireless communication a second UE is described. The apparatus may include means for receiving, on a beam for transmitting sidelink control signaling associated with a random access procedure or a beam failure recovery procedure, an inter-UE coordination message indicating a set of preferred resources associated with the beam, means for transmitting, on the beam, the sidelink control signaling to a first UE in accordance with the set of preferred resources associated with the beam, and means for establishing or modifying a connection between the first UE and the second UE based on the sidelink control signaling.

A non-transitory computer-readable medium storing code for wireless communication a second UE is described. The code may include instructions executable by a processor to receive, on a beam for transmitting sidelink control signaling associated with a random access procedure or a beam failure recovery procedure, an inter-UE coordination message indicating a set of preferred resources associated with the beam, transmit, on the beam, the sidelink control signaling to a first UE in accordance with the set of preferred resources associated with the beam, and establish or modify a connection between the first UE and the second UE based on the sidelink control signaling.

In some examples of the method, apparatuses, and non-transitory computer-readable medium described herein, receiving the inter-UE coordination message may include operations, features, means, or instructions for receiving an inter-UE coordination request indicating to the second UE to provide one or more preferred resources of a second set of preferred resources for receiving a response to the sidelink control signaling.

Some examples of the method, apparatuses, and non-transitory computer-readable medium described herein may further include operations, features, means, or instructions for transmitting, in response to the inter-UE coordination request, an indication of the one or more preferred resources of the second set of preferred resources, where the sidelink control signaling includes the indication and receiving the response to the sidelink control signaling in accordance with the one or more preferred resources of the second set of preferred resources.

In some examples of the method, apparatuses, and non-transitory computer-readable medium described herein, establishing or modifying the connection may include operations, features, means, or instructions for receiving, in response to the sidelink control signaling, a beam failure recovery response associated with the beam failure recovery procedure or a random access response associated with the random access procedure, where the sidelink control signaling includes a beam failure recovery signal or a random access signal.

Some examples of the method, apparatuses, and non-transitory computer-readable medium described herein may further include operations, features, means, or instructions for transmitting a request for the inter-UE coordination message, where receiving the inter-UE coordination message may be in response to the request.

Some examples of the method, apparatuses, and non-transitory computer-readable medium described herein may further include operations, features, means, or instructions for transmitting, to the first UE, sidelink control information indicating scheduling information for the first UE, where the inter-UE coordination message indicates an updated set of preferred resources based on the scheduling information for the first UE.

In some examples of the method, apparatuses, and non-transitory computer-readable medium described herein, the inter-UE coordination message may be received from the first UE on the beam in accordance with a spatial filter and transmitting the sidelink control signaling may be in accordance with the spatial filter.

In some examples of the method, apparatuses, and non-transitory computer-readable medium described herein, receiving the inter-UE coordination message may include operations, features, means, or instructions for receiving, on the beam, synchronization information associated with the first UE, system information associated with the first UE, or both.

In some examples of the method, apparatuses, and non-transitory computer-readable medium described herein, receiving the inter-UE coordination message may include operations, features, means, or instructions for receiving, on the beam, a channel busy ratio measurement associated with the beam.

Some examples of the method, apparatuses, and non-transitory computer-readable medium described herein may further include operations, features, means, or instructions for transmitting, for the beam, a request for the channel busy ratio measurement, where receiving the channel busy ratio measurement may be based on the request.

In some examples of the method, apparatuses, and non-transitory computer-readable medium described herein, the request for the channel busy ratio measurement indicates a transmission configuration indicator state for the beam, a spatial relation for the beam, a spatial domain filter for the beam, the beam, or any combination thereof.

Some examples of the method, apparatuses, and non-transitory computer-readable medium described herein may further include operations, features, means, or instructions for transmitting a request for the inter-UE coordination message, where receiving the channel busy ratio measurement may be based on the request.

Some examples of the method, apparatuses, and non-transitory computer-readable medium described herein may further include operations, features, means, or instructions for transmitting, on the beam, a data transmission based on one or more transmission parameters corresponding to the channel busy ratio measurement.

7

Figure 5:
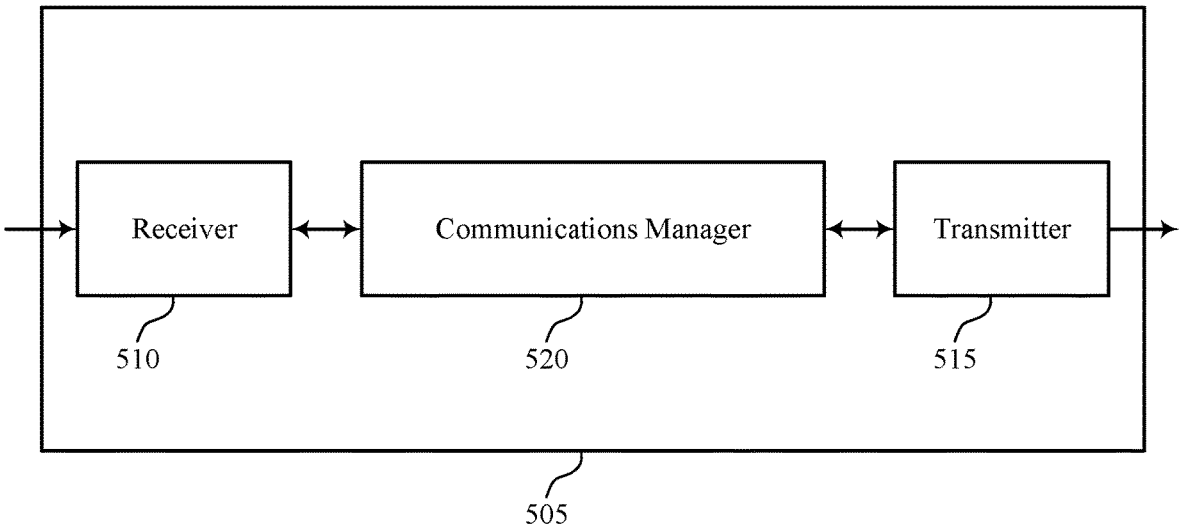
Figure 6:
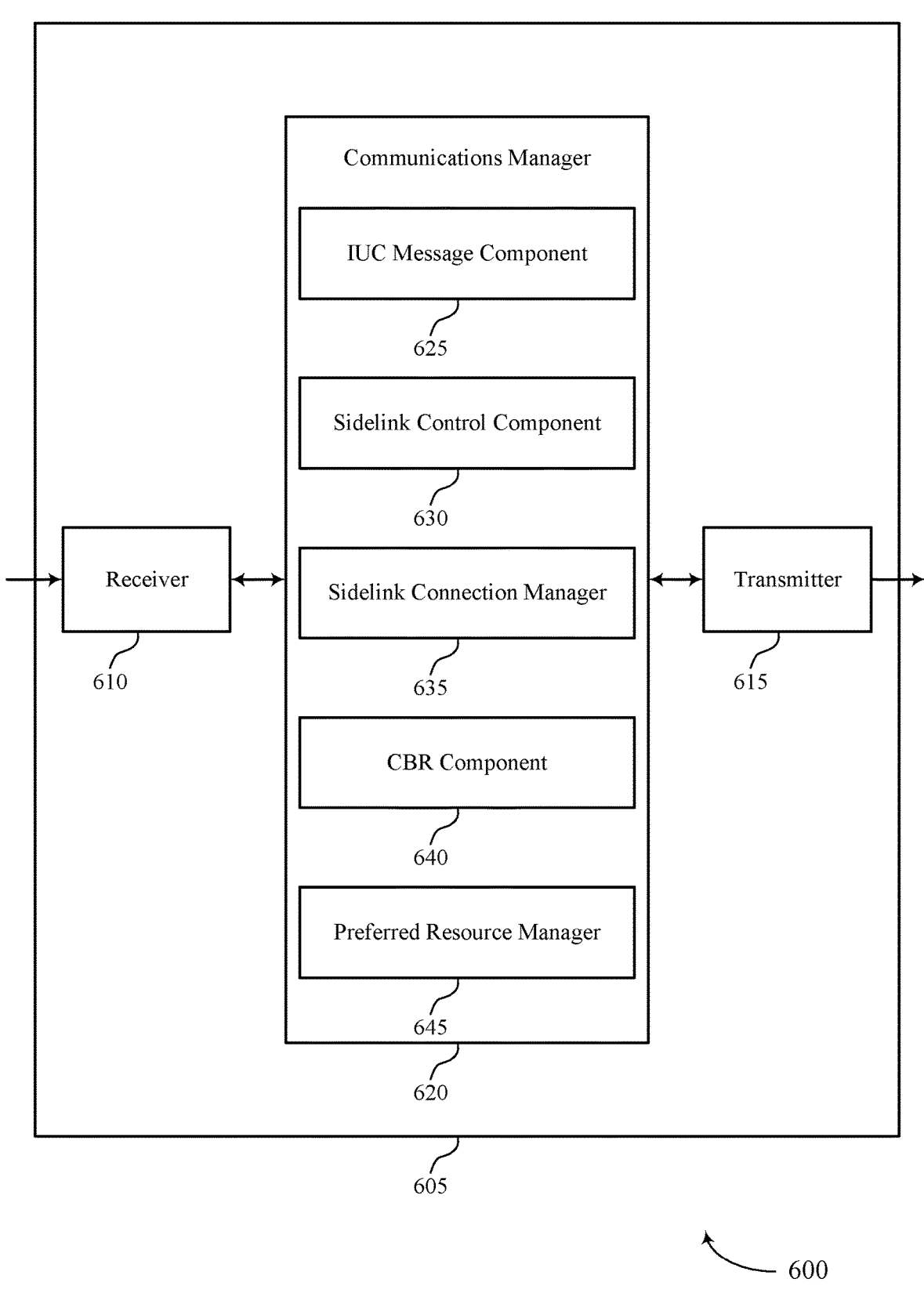

FIGS. 5 and 6 show block diagrams of devices that support IUC for resource management in accordance with one or more aspects of the present disclosure.

Figure 7:
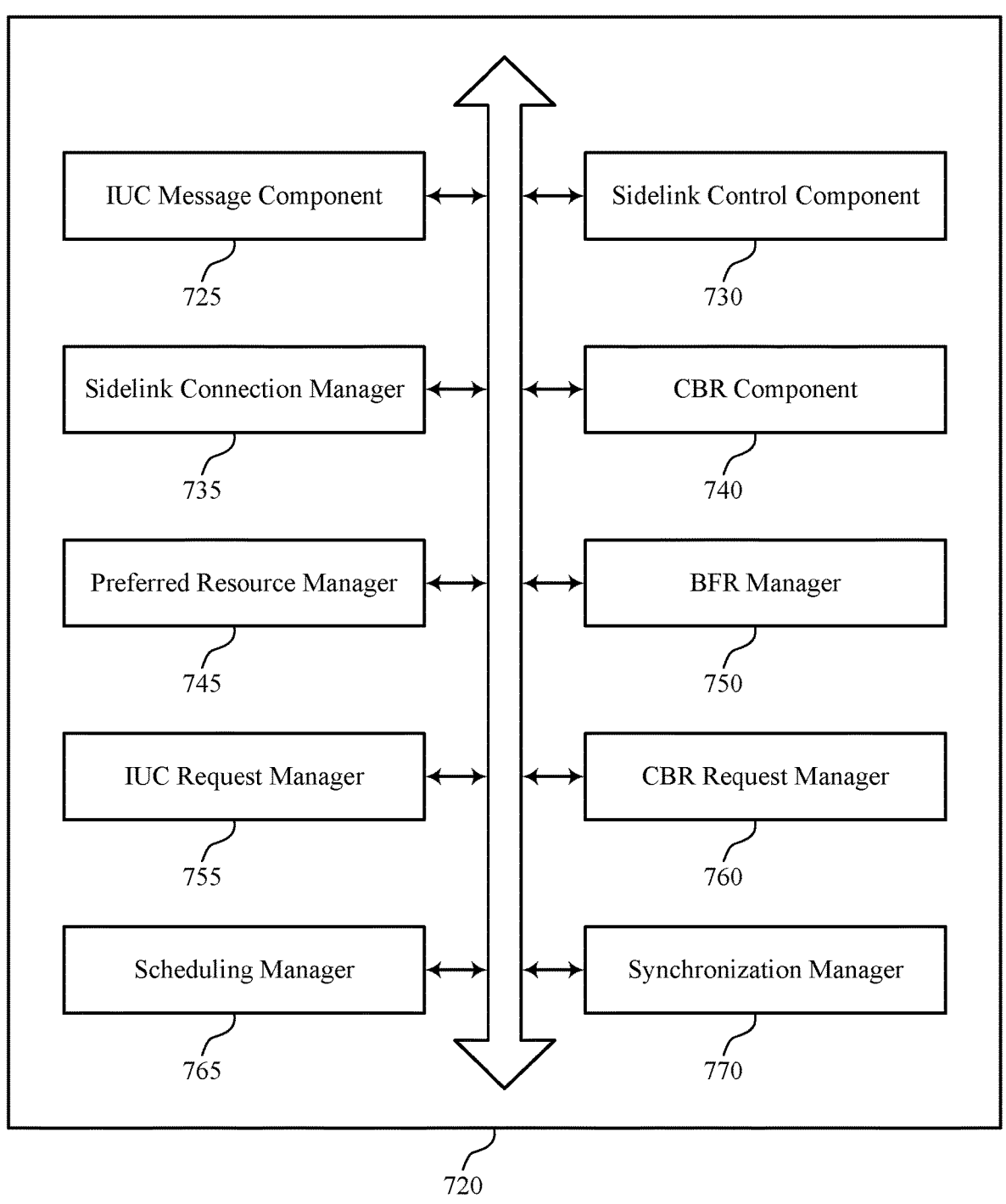

FIG. 7 shows a block diagram of a communications manager that supports IUC for resource management in accordance with one or more aspects of the present disclosure.

Figure 8:
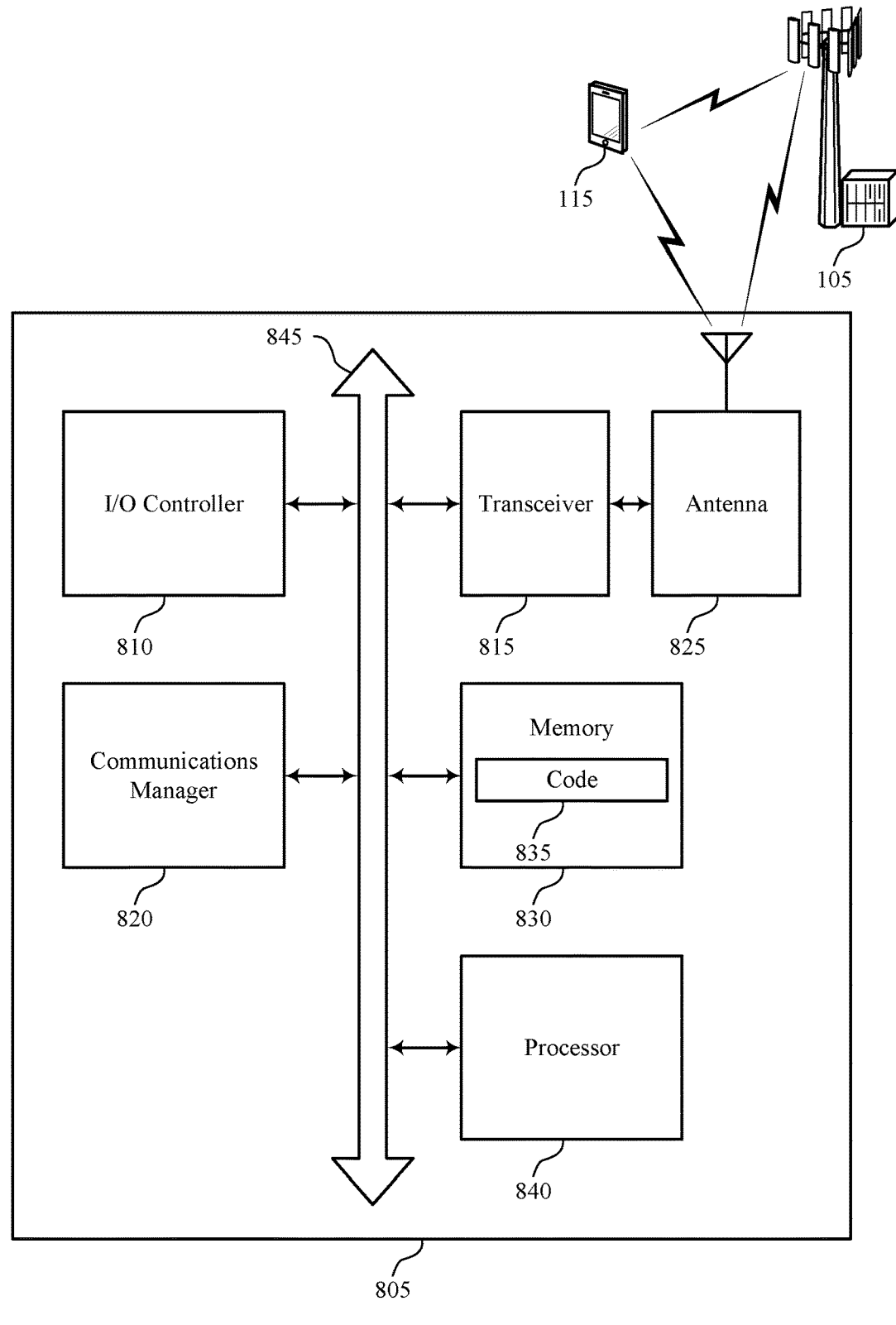

FIG. 8 shows a diagram of a system including a device that supports IUC for resource management in accordance with one or more aspects of the present disclosure.

FIGS. 9 through 12 show flowcharts illustrating methods that support IUC for resource management in accordance with one or more aspects of the present disclosure.

DETAILED DESCRIPTION

In some wireless communications systems, assistance information communicated in inter-user equipment coordination (IUC) messages may vary depending on which beam of a receiving user equipment (UE) is used for a sidelink communication with a transmitting UE. Additionally, or alternatively, the receiving UE may perform channel sensing for communication with the transmitting UE, but the receiving UE may be unable to sense resource use in an area of the network in which the transmitting UE is located. This may result in a beam pair establishment problem, and the receiving UE and the transmitting UE may select a relatively poor set of beams for sidelink communications.

In accordance with examples as disclosed herein, a receiving UE may broadcast messages containing IUC information using multiple beams of the receiving UE. In some examples, the IUC information in each message may be different such that each message may be specific to the beam of the receiving UE carrying that message. For example, each IUC information may contain different preferred resources or non-preferred resources to be used by the receiving UE to receive a transmission from a transmitting UE. The transmitting UE may receive a message containing IUC information from one of the beams of the receiving UE. The transmitting UE may transmit a signal (e.g., a random access channel (RACH) signal or a beam failure recovery (BFR) signal) using resources based on the IUC information contained in the received message. Accordingly, the receiving UE and the transmitting UE may establish a beam pair according to IUC information specific to a receive beam to be used by the receiving UE.

In some examples, a transmitting UE may transmit a message requesting a channel busy ratio (CBR) from a receiving UE. For example, the transmitting UE may transmit request for IUC information to the receiving UE containing a request for the CBR. In some examples, the message may specify a transmission configuration indicator (TCI) state, spatial relation, spatial domain filter, or beam according to which the receiving UE is to measure the CBR. The receiving UE may measure the CBR and transmit a message containing IUC information that may indicate the measured CBR. In some cases, the IUC information may include preferred resources or non-preferred resources of the receiving UE. The receiving UE may measure the CBR according to the preferred resources or to resources other than the non-preferred resources of the receiving UE. Accordingly, the transmitting UE may obtain channel information from a busy area in which the receiving UE is operating.

Aspects of the disclosure are initially described in the context of wireless communications systems. Aspects of the disclosure are additionally described in the context of resource diagrams and process flows. Aspects of the disclosure are further illustrated by and described with reference to apparatus diagrams, system diagrams, and flowcharts that relate to IUC for resource management.

Figure 1:
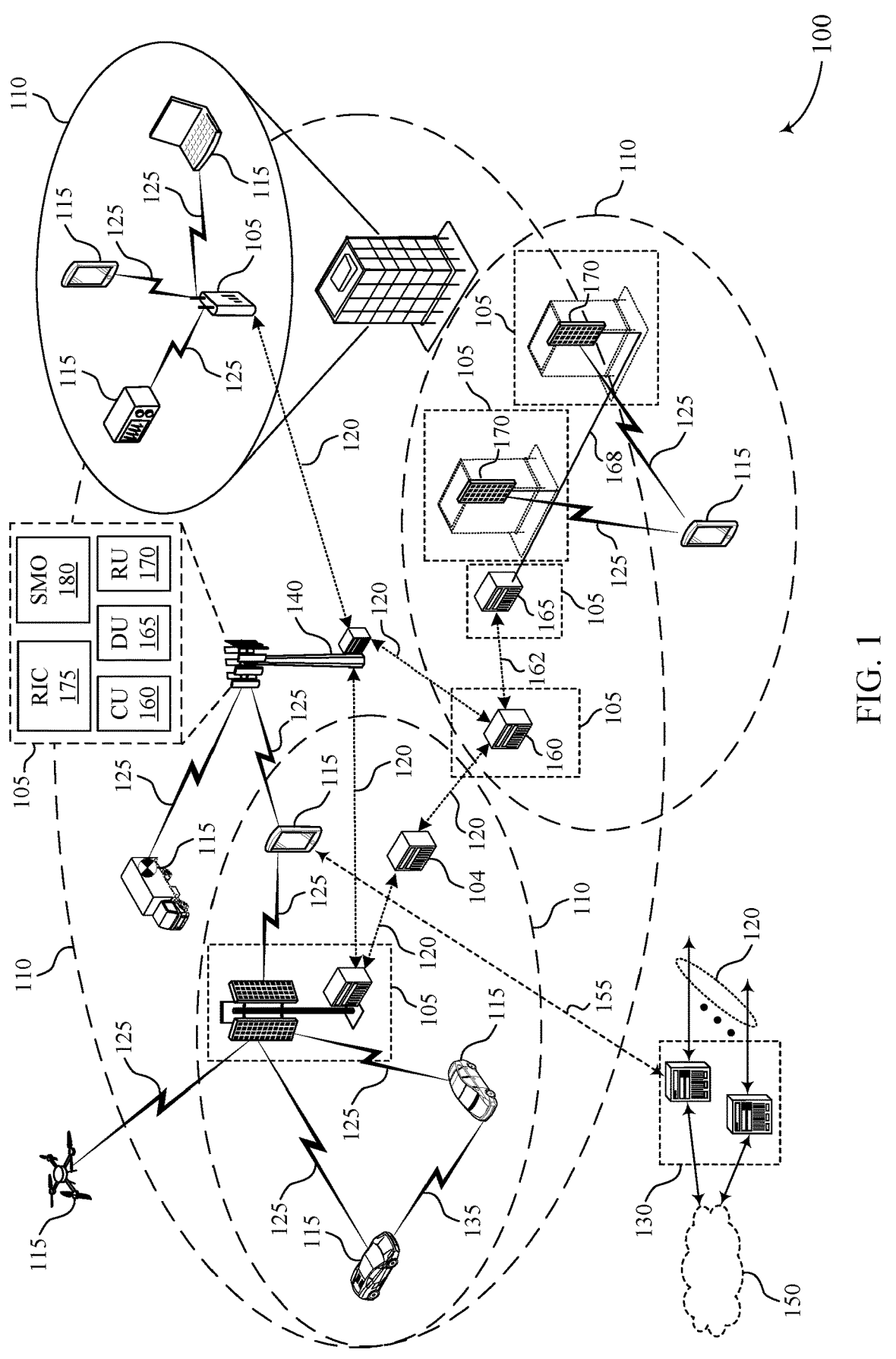
FIG. 1 illustrates an example of a wireless communications system that supports inter-user equipment coordination (IUC) for resource management in accordance with one or more aspects of the present disclosure.

FIG. 1 illustrates an example of a wireless communications system 100 that supports IUC for resource management in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support IUC for resource management as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, a UE 115, such as a transmitting UE, may perform sidelink communications according to different modes. In one mode, for example, the UE 115 may rely on a network entity 105 managing sidelink communication resources. In this mode, the network entity may send a message to the UE 115 indicating the sidelink communication resources. In another mode, for example, the UE 115 may determine sidelink communication resources. In cases where a transmitting UE 115 determines the sidelink communication resources, the transmitting UE 115 may sense resources used by other transmitting UEs 115, and the transmitting UE 115 may determine available sidelink communication resources for communications with a receiving UE 115. For example, some transmitting UEs 115 may reserve communication resources using sidelink control information (SCI). The transmitting UE 115 may sense the channel by, for example, receiving SCIs from nearby transmitting UEs 115, and determine resources that are available to be used by the transmitting UE 115 in future sidelink communications.

In some examples, UEs 115 may perform IUC procedures. In some cases (e.g., Scheme 1), a transmitting UE 115 may select or reselect communication resources based on assistance information received from nearby sidelink UEs 115. For example, the nearby sidelink UEs 115 may indicate preferred resource or non-preferred resources to the transmitting UE 115. In some examples, the assistance information may be transmitted by a UE 115 based on a request from the transmitting UE 115. In other examples, the assistance information may be transmitted by a UE 115 based on a condition being satisfied at the UE 115. In some cases (e.g., Scheme 2), a transmitting UE 115 may select communication resources and broadcast reservation messages. A nearby UE 115 may receive the reservation message and transmit a message to the transmitting UE 115 indicating that the nearby UE 115 has a conflict with resources selected by the transmitting UE 115.

A transmitting UE 115 may transmit a request (e.g., an IUC request message) for a nearby UE 115 to provide assistance information (e.g., IUC information) regarding preferred or non-preferred resources for a transmission from the transmitting UE 115 to the nearby UE 115. The request may include, for example, a priority value for the transmission, a quantity of subchannels for the transmission, a resource reservation interval, starting times and ending times of a resource selection window, or a combination thereof. In some examples, the assistance information may include an indication of resources (e.g., preferred resources) that the nearby UE 115 may prefer that the transmitting UE 115 uses for the transmission. Additionally, or alternatively, the assistance information may include an indication of resources (e.g., non-preferred resources) that the nearby UE 115 may prefer that the transmitting UE 115 does not use for the transmission. The transmitting UE 115 may receive assistance information indicating preferred resources, and the transmitting UE 115 may attempt to use the indicated preferred resources for the transmission. Similarly, the transmitting UE 115 may receive assistance information indicating non-preferred resources, and the transmitting UE may refrain from using the non-preferred resources for the transmission.

In some examples, a receiving UE 115 may select preferred resources or non-preferred resources based on resource usage by nearby transmitting UEs 115. For example, the receiving UE 115 may sense (e.g., receive) a reservation SCI from a nearby transmitting UE 115 that reserves a first resource, and the receiving UE 115 may select a second resource different from the first resource as a preferred resource. Additionally, or alternatively, the UE 115 may select the first resource as a non-preferred resource. The receiving UE 115 may transmit a message (e.g., IUC information) indicating the preferred resource or the non-preferred resource, which may aid in avoiding interference with the transmission of the nearby transmitting UE 115.

In some cases, a transmitting UE 115 may request preferred resources from a receiving UE 115 if the receiving UE 115 is an intended receiver for a transmission of the transmitting UE 115, and the transmitting UE 115 is selecting resources for the transmission that are determined to be available by the receiving UE 115. Similarly, the transmitting UE 115 may request non-preferred resources from the receiving UE 115 if the receiving UE 115 is an intended receiver for the transmission, and the transmitting UE 115 is selecting resources to avoid interference from nearby transmissions. Additionally, or alternatively, if the receiving UE 115 is not an intended receiver for the transmission, the transmitting UE 115 may request non-preferred resources to avoid interfering with transmissions being received by the receiving UE 115.

A transmitting UE 115 may receive IUC information from a receiving UE 115 indicating a preferred resource set or a non-preferred resource set. The transmitting UE 115 may transmit using resources based on the received IUC information from the receiving UE 115 and, in some cases, sensing performed by the transmitting UE 115 or IUC information received from other UEs 115. In some cases, the transmitting UE 115 may check if a quantity of candidate resources is below a threshold, and if so, the transmitting UE 115 may include resources outside the preferred resource set or inside the non-preferred resource set until the threshold is achieved.

In some examples, a UE 115 may transmit IUC information using a medium access control (MAC) control element (MAC-CE) message or an SCI 2-C message. In some cases, the UE 115 may use a MAC-CE message for indicating more than two preferred resources or non-preferred resources, and the UE 115 may use a MAC-CE or an SCI 2-C message when indicating 2 or less preferred resources or non-preferred resources. The preferred resources or non-preferred resources may be indicated using one or more of a time resource indicator value (TRIV), a frequency resource indicator value (FRIV), and a resource reservation interval (RRI).

The message containing IUC information may include one or more fields corresponding to an indicator for providing or requesting information, resource combinations, first resource location, reference slot location, resource set type, and lowest subchannel indices for the first resource location of each TRIV. In some examples, the field size (e.g., in bits) for the field corresponding to resource combinations may be given by Equation 1 below, where N corresponds to the resource number indicated in the IUC information, $$N^{SL}_{subChannel}$$

is provided by higher layer parameter sl-NumSubchannel, and Y is given by Equation 2 below, where $N_{rsv\_period}$ is the quantity of entries in higher layer parameter sl-resourcereservePeriodList if the higher layer parameter is configured, and where Y is zero if the higher layer parameter is not configured.

$$N * \left\{ \log_2 \frac{N^{SL}_{subChannel}(N^{SL}_{subChannel} + 1)(2N^{SL}_{subChannel} + 1)}{6} \right\} + 9 + Y \quad (1)$$

$$Y = \log_2 N_{rsv\_period} \quad (2)$$

In further examples, the field size for the field corresponding to the first resource locations may be given by Equation 3 below, where X is provided by a configured or preconfigured maximum value of a slot offset for a case in which the message is used as a container of IUC information.

$$(N-1)^* \log_2 X \quad (3)$$

The field size for the field corresponding to the reference first slot location may be given by Equation 4 below, where μ is a value of zero, one, two or three corresponding to a subcarrier spacing (SCS) of 15 kHz, 30 kHz, 60 kHz, or 120 kHz, respectively.

19

10+log$_2$(10*2$^\mu$)  (4)

The field size for the field corresponding to the lowest subchannel indices for the first resource location of each TRIV may be given by Equation 5 below.

$$N * \log_2 N^{SL}_{subChannel} \quad (5)$$

In some examples, a UE 115 may determine a CBR, which may be a calculation of a quantity of resource usage by a network sensed by a UE 115 divided by a total quantity of resources available, for example, in a CBR measurement window. The UE 115 may sense resource usage by the network based on a sidelink received signal strength indicator (SL RSSI), which may be a linear average of the total received power observed in a configured sub-channel in OFDM symbols of a slot configured for sidelink data and control transmissions, starting from a second OFDM symbol. The UE 115 may determine the CBR based on a reference point for SL RSSI, which may be an antenna connector of the UE 115, or based on a combined signal from antenna elements corresponding to a receiving branch of the UE 115, depending on a frequency range for the SL RSSI. The UE 115 may use a CBR measurement to select a quantity of HARQ retransmissions, parameters for sidelink transmissions in a slot (e.g., L$_{subCH}$), modulation and coding scheme (MCS) selection, and channel occupancy ratio (CR) limit selection, for example.

In some cases, assistance information determined by a receiving UE 115 and communicated in IUC messages may depend on which beam of the receiving UE 115 is being used for sidelink communication with a transmitting UE 115. Additionally, the transmitting UE 115 may perform channel sensing for an upcoming communication with the receiving UE 115 that is located in a busy area of the network, which may be an area having a relatively high quantity of transmissions or transmitting devices. However, the transmitting UE 115 may be unable to sense resource use in the busy area of the network in which the receiving UE 115 is located. This may result in a beam pair establishment problem, and the receiving UE 115 and the transmitting UE 115 may select a relatively poor set of beams for sidelink communications.

In accordance with examples as disclosed herein, a receiving UE 115 may broadcast messages containing IUC information using multiple beams of the receiving UE 115. In some examples, the IUC information in each message transmitted on each beam may be different for each beam of the receiving UE 115. For example, each IUC information may contain different preferred resources or non-preferred resources to be used by the receiving UE 115 to receive a transmission from a transmitting UE 115. The transmitting UE 115 may receive a message containing IUC information from one of the beams of the receiving UE 115. The transmitting UE may transmit a signal (e.g., a RACH signal or a BFR signal) using resources based on the IUC information contained in the received message. Accordingly, the receiving UE 115 and the transmitting UE 115 may establish a beam pair according to IUC information specific to a receive beam to be used by the receiving UE 115.

In some examples, a transmitting UE 115 may transmit a message requesting a CBR from a receiving UE 115. For example, the transmitting UE 115 may transmit request for IUC information to the receiving UE 115 containing a request for the CBR. In some examples, the message may specify a TCI state, spatial relation, spatial domain filter, or beam according to which the receiving UE 115 is to measure the CBR. The receiving UE 115 may measure the CBR and transmit a message containing IUC information that may indicate the measured CBR. In some cases, the IUC information may include preferred resources or non-preferred resources of the receiving UE 115. The receiving UE 115 may measure the CBR for the preferred resources or for resources other than the non-preferred resources of the receiving UE 115. Accordingly, the transmitting UE 115 may obtain channel information from a busy area of the network in which the receiving UE 115 is operating.

Figure 2:
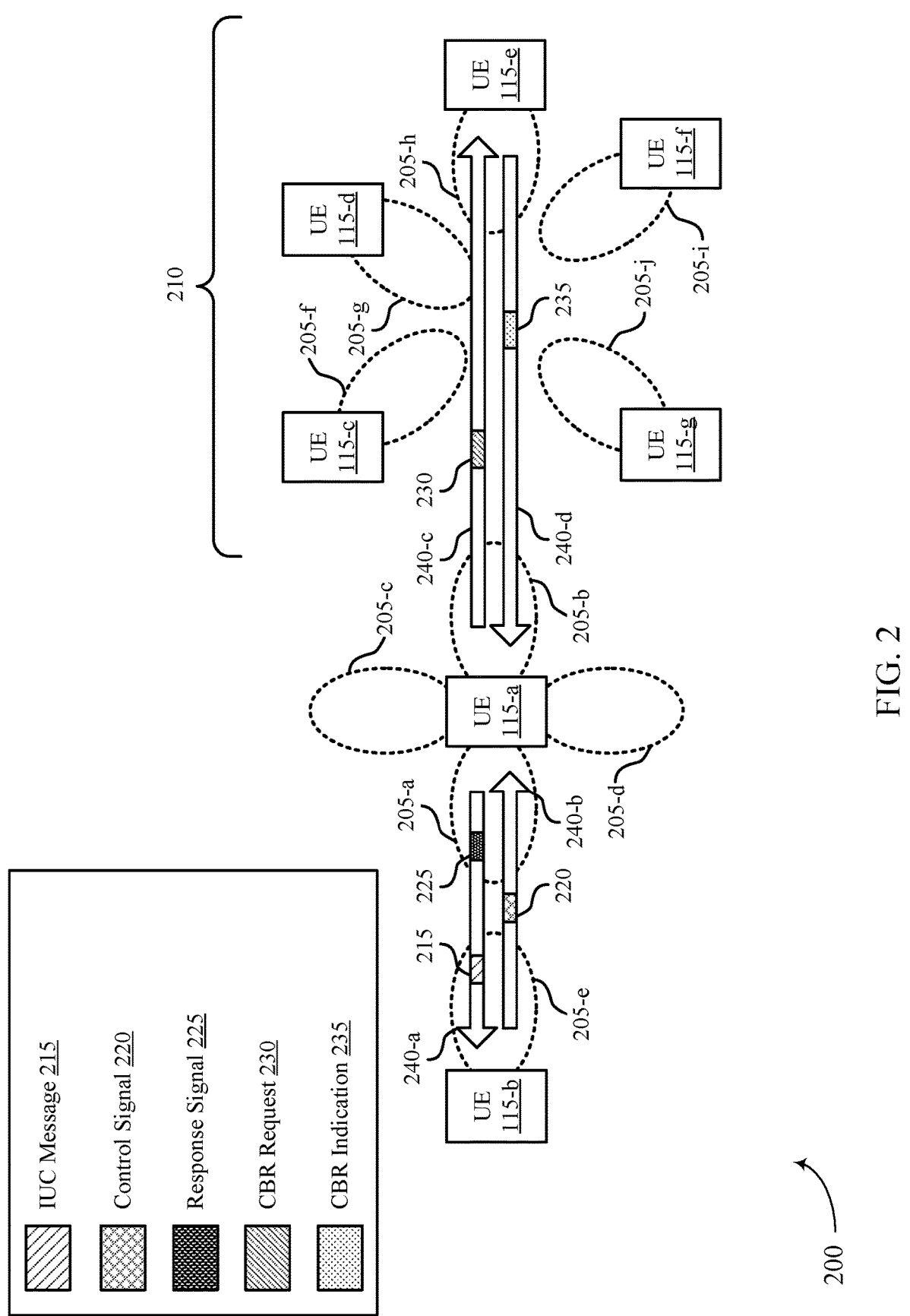
FIG. 2 illustrates an example of a wireless communications system that supports IUC for resource management in accordance with one or more aspects of the present disclosure.

FIG. 2 illustrates an example of a wireless communications system 200 that supports IUC for resource management in accordance with one or more aspects of the present disclosure. The wireless communication system 200 may be an example of a wireless communications system 100 as described herein, with reference to FIG. 1. The wireless communication system 200 may include a UE 115-a, a UE 115-b, a UE 115-c, a UE 115-d, a UE 115-e, a UE 115-f, and a UE 115-g, which may be examples of UEs 115 as described herein, with reference to FIG. 1. The UE 115-a may support sidelink communications with other UEs 115 via communication links 240-a, 240-b, 240-c, and 240-d, which may be examples of communication links 125 as described herein, with reference to FIG. 1.

In some examples, UEs 115 may perform sidelink communications using one or more beams 205 for reception or transmission of sidelink messages. For example, UE 115-a may support sidelink communications using a beam 205-a, a beam 205-b, a beam 205-c, and a beam 205-d. Similarly, the UE 115-b may support communications using a beam 205-e, the UE 115-c may use a beam 205-f, the UE 115-d may use a beam 205-g, the UE 115-e may use a beam 205-h, the UE 115-f may use a beam 205-i and the UE 115-g may use a beam 205-j.

In some examples, one or more UEs 115 may communicate assistance information using an IUC message 215 to aid in performing sidelink communications. In some cases, however, the assistance information may vary depending on which beam 205 a UE 115 is using for reception of sidelink communication. Additionally, a receiving UE 115 may perform channel sensing for communication with a transmitting UE 115 located in a busy area 210, which may be an area having a relatively high quantity of transmissions or transmitting devices, but the receiving UE 115 may be unable to sense resource use in the busy area 210. This may result in a beam pair establishment problem, and the receiving UE 115 and the transmitting UE 115 may select a relatively poor set of beams for a transmission.

In accordance with examples as described herein, the UE 115-a may transmit an IUC message 215 via one or more beams 205. For example, the UE 115-a may transmit an IUC message 215 on each of the beam 205-a, the beam 205-b, the beam 205-c, and the beam 205-d. In some examples, the IUC message 215 may be different for each beam 205. For example, each IUC message 215 may indicate resources (e.g., RACH resources) such as preferred resources or non-preferred resources for sidelink communication corresponding to each respective beam 205. That is, the UE 115-a may determine preferred resources or non-preferred resources for receiving a signal (e.g., a BFR or a RACH signal) on one or more beams 205. The UE 115-a may then broadcast, on each respective beam 205, an IUC message indicating the preferred or non-preferred resources associated with each respective beam 205.

The UE 115-a may select preferred resources or non-preferred resources to include in an IUC message 215 via channel sensing. Some transmitting UEs 115 may reserve communication resources using SCI. The UE 115-*a* may perform channel sensing by, for example, receiving SCIs from nearby transmitting UEs 115. The UE 115-*a* may determine resources that are available to be used for sidelink communications based on the channel sensing. In some examples, the UE 115-*a* may select preferred resources or non-preferred resources for the beam 205-*a* to reduce interference in communications using the beam 205-*a*. Similarly, the UE 115-*a* may select non-preferred resources based on resources that are in use by transmitting UEs 115. Preferred resources and non-preferred resources are illustrated in more detail herein, with reference to FIG. 3.

In some examples, the IUC message 215 may indicate a time during which the UE 115-*a* is to listen for a control signal (e.g., a RACH or BFR signal) from another UE 115. In some cases, the IUC message 215 may contain or transmitted together with a master information block (MIB) or a system information block (SIB). The UE 115-*a* may use a spatial filter to transmit the IUC message 215. In some cases, the IUC message 215 may include a request (e.g., an IUC request) that may indicate a receiving UE 115 to include information in a control signal 220 (e.g., a BFR or a RACH signal) regarding preferred resources or non-preferred resources for receiving a response signal 225 (e.g., a BFR or a RACH response). In some examples, the IUC message 215 may include synchronization information or other system information.

The UE 115-*b* may receive, via the beam 205-*e*, an IUC message 215 broadcasted by the UE 115-*a* via the beam 205-*a*. For example, the UE 115-*b* may scan the channel for IUC messages 215 for initial access from any UE 115. The UE 115-*b* may detect and receive, via the beam 205-*e*, the IUC message 215 from the UE 115-*a*. The UE 115-*b* may decide to connect (e.g., initiate sidelink communications) with the UE 115-*a* and transmit a control signal 220 (e.g., a BFR or a RACH signal) to the UE 115-*a*. The UE 115-*b* may transmit the control signal 220 via the beam 205-*e* using a preferred resource indicated in the IUC message 215 received from the UE 115-*a*. Additionally, or alternatively, the UE 115-*b* may transmit the control signal 220 via the beam 205-*e* using a resource that is not a non-preferred resource indicated in the IUC message 215 received from the UE 115-*a*. In some examples, the UE 115-*b* may transmit the control signal 220 during a time duration indicated in the IUC message 215 during which the UE 115-*a* is to be monitoring for a control signal via the beam 205-*a*. In some cases, the UE 115-*b* may transmit the control signal 220 using a spatial filter used to receive the IUC message 215 from the UE 115-*a*. In some examples, such as when requested by the UE 115-*a* in the IUC message 215, the UE 115-*b* may include preferred resource or non-preferred resource information in the control signal 220 or in another message (e.g., an IUC message 215).

The UE 115-*a* may receive, via the beam 205-*a*, the control signal 220 from the UE 115-*b*. For example, the UE 115-*a* may receive the control signal 220 via a resource indicated in the IUC message 215 transmitted via the beam 205-*a*. In some examples, the control signal 220 may be received during a time duration indicated in the IUC message 215 during which the UE 115-*a* is monitoring for control signals 220 via the beam 205-*a*. The UE 115-*a* may transmit a response signal 225 (e.g., a RACH or a BFR response signal) to the UE 115-*b*. In some examples, such as when the IUC message 215 contains a request for the UE 115-*b* to provide preferred resource or non-preferred resource information, the UE 115-*a* may transmit the response signal 225 using the preferred resources or resources that are not non-preferred resources of the UE 115-*b*.

In some examples, the UE 115-*a* may adjust transmission parameters to minimize interference to other UEs 115 in a busy area 210 (e.g., an area having a relatively high quantity of transmissions or transmitting devices). For example, if the UE 115-*a* communicates with the UE 115-*b*, which may be outside of busy area 210, the UE 115-*a* may refrain from adjusting transmission parameters to reduce interference. Meanwhile, if the UE 115-*a* communicates with the UE 115-*e*, the UE 115-*a* may use adjusted transmission parameters, such as by using a reduced transmit bandwidth for transmissions. However, the UE 115-*a* may be unaware that the UE 115-*e* is located within the busy area 210, as the UE 115-*a* may be unable to perform channel sensing in the busy area 210.

Accordingly, the UE 115-*a* may transmit a CBR request 230 to the UE 115-*e* to aid in determining whether to adjust transmission parameters. For example, the UE 115-*a* may transmit the CBR request 230 using the beam 205-*b* to the UE 115-*e* (e.g., via a communication link 240-*c*). In some examples, the CBR request 230 may be part of an IUC message 215, such as a request for IUC information. For example, a request for IUC information may implicitly include a request for a CBR measurement. In some cases, the CBR request 230 may specify a TCI state, a spatial relation, a spatial domain filter, a beam, or a combination thereof, for which the UE 115-*e* should measure a CBR. For example, the UE 115-*a* may indicate to the UE 115-*e* in the CBR request 230 to use the beam 205-*h* for performing the CBR measurement. In some examples, such as when the CBR request 230 is part of an IUC message 215, the CBR request 230 may include preferred resources or non-preferred resources.

The UE 115-*e* may perform a CBR measurement (e.g., an reception CBR measurement) based on the received CBR request 230. For example, the UE 115-*e* may receive the CBR request 230 (e.g., as part of an IUC message 215) and perform a CBR measurement by sensing resource use in the busy area 210, as described in more detail herein, with reference to FIG. 1. In some examples, the UE 115-*e* may use a TCI state, a spatial relation, a beam 205, a spatial domain filter, or a combination thereof (e.g., as specified in the CBR request 230), to perform the CBR measurement. The UE 115-*e* may perform the CBR measurement according to preferred resources or non-preferred resources associated with the CBR request 230. For example, the CBR measurement may be performed on the preferred resources associated with the CBR request 230. In some other examples, the CBR measurement may be performed on resources that are not the non-preferred resources associated with the CBR request 230.

The UE 115-*e* may transmit a message containing a CBR indication 235, which may indicate to the UE 115-*a* the CBR measurement performed by the UE 115-*e*. Accordingly, the UE 115-*a* may adjust transmission parameters according to the CBR measurement performed by the UE 115-*e* within the busy area 210, and the UE 115-*a* may decide to use a reduced transmit bandwidth for sidelink transmissions with the UE 115-*e*.

Figure 3:
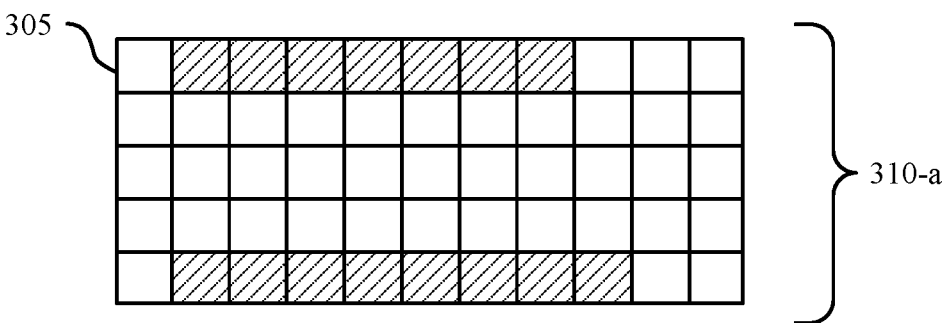
FIG. 3 illustrates an example of a resource diagram that supports IUC for resource management in accordance with one or more aspects of the present disclosure.
Figure 3:
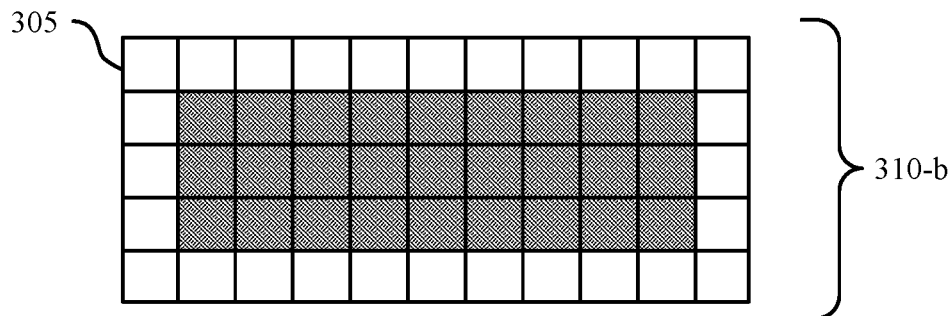
Figure 3:
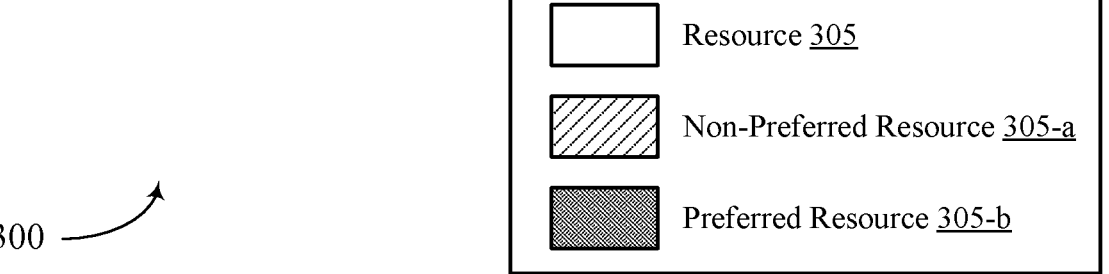

FIG. 3 illustrates an example of a resource diagram 300 that supports IUC for resource management in accordance with one or more aspects of the present disclosure. The resource diagram 300 illustrates resources 305, which may be an example preferred resources and non-preferred resources as described herein, with reference to FIGS. 1 and 2. The resource diagram 300 illustrates resource information 310-*a* and resource information 310-*b*, which may be examples of information included within IUC messages 215 as described herein, with reference to FIG. 2.

In some examples, a UE 115 may select preferred resources 305-*b* or non-preferred resources 305-*a* based on resource usage by nearby transmitting UEs 115. For example, the receiving UE 115 may sense (e.g., receive) reservation SCI from a nearby transmitting UE 115 that reserves a first resource 305. The receiving UE 115 may select a second resource different from the first resource as a preferred resource. Additionally, or alternatively, the UE 115 may select the first resource as a non-preferred resource. The receiving UE 115 may transmit a message (e.g., IUC information) indicating the preferred resource or the non-preferred resource, which may aid in avoiding interference with transmissions of the nearby transmitting UE 115.

In some examples, such as when a receiving UE 115 knows or assumes properties of an intended transmission from a transmitting UE 115, the receiving UE 115 may perform physical layer channel sensing to determine available resources. For example, the receiving UE 115 may perform physical layer resource exclusion on a set of resources 305 in a resource selection window based on slots that were not sensed by the receiving UE 115. The receiving UE 115 may then check if a quantity of the remaining resources 305 is below a threshold quantity, where the threshold quantity may be based on one or more parameters (e.g., a parameter corresponding to a priority of a transmitting UE 115, $prio_{Tx}$) and reinitialize the set to contain the resources 305 in the resource sensing window. The receiving UE 115 may then perform resource exclusion on the set based on received SCIs from nearby UEs 115. The receiving UE 115 may check if the quantity of remaining resources 305 is below the threshold quantity, and if so, re-start the physical layer resource exclusion process after increasing one or more internal parameters associated with a received priority field and a priority of the receiving UE 115 (e.g., $Th(p_i, p_j)$) by some amount (e.g., 3 decibels (dB)). Otherwise, the receiving UE 115 may transmit a message (e.g., a MAC-CE message) indicating the set of resources to the transmitting UE 115.

In other examples, such as when the receiving UE 115 does not know properties of the intended transmission from a transmitting UE 115, the receiving UE 115 may measure reference signal received power (RSRP) of transmission of nearby transmit UEs 115, and the receiving UE 115 may compute priorities and resource reservations of the nearby transmit UEs 115. In some examples, preferred resources 305-*b* (e.g., candidate single-slot resources) for a receiving UE 115 may exclude resources overlapping with reserved resources 305 of transmitting UEs 115 with an RSRP measurement that exceeds a threshold RSRP. In some examples, the receiving UE 115 may determine preferred resources 305-*b* based on one or more parameters (e.g., resource window starting and ending times, $prio_{Tx}$, a quantity of sub-channels to be used for transmission ($L_{subCH}$), and a resource reservation interval ($P_{rsvp\_Tx}$)) For example, the receiving UE 115 may determine the threshold RSRP based on a parameter corresponding to a priority of a transmitting UE 115 (e.g., $prio_{Tx}$). In some cases, the one or more parameters may be provided in a request for IUC information by the transmitting UE 115. Additionally, or alternatively, the receiving UE 115 may determine the one or more parameters, which may be configured or preconfigured to the receiving UE 115.

In some cases, a receiving UE 115 may determine non-preferred resources 305-*a* as being resources 305 reserved by other UEs 115 having a measured RSRP larger than an RSRP threshold configured to the receiving UE 115, and the RSRP threshold may be based on a priority value of the other UEs 115 indicated in SCI. This may aid receiving UE 115 in avoiding interference from the other UEs 115 when receiving a transmission. Additionally, or alternatively, the receiving UE 115 may determine non-preferred resources 305-*a* as being resources 305 of other UEs 115 that are being used to transmit to the receiving UE 115 and have a measured RSRP smaller than the RSRP threshold. This may avoid the transmission being received by the receiving UE 115 interfering with other transmissions being received by the receiving UE 115.

A first UE 115 may transmit an indication of preferred resources or non-preferred resources (e.g., in IUC information) to a second UE 115 to aid in sidelink communications. For example, the first UE 115 may transmit IUC information regarding preferred resources or non-preferred resources for a transmission from the second UE 115 to the first UE 115. In another example, the first UE 115 may indicate preferred resources or non-preferred resources (e.g., in a CBR request) for the second UE 115 to use in a CBR measurement. These applications are described in more detail herein, with reference to FIG. 2.

In some examples, a first UE 115 may transmit a message (e.g., an IUC message) indicating resource information 310-*a*, which may include one or more non-preferred resources 305-*a*, to a second UE 115. The second UE 115 may perform operations based on resources 305 other than the non-preferred resources 305-*a*. For example, the second UE 115 may perform a CBR measurement using resources 305 other than the non-preferred resources 305-*a*. In some other examples, the second UE 115 may perform sidelink communication with the UE 115 using resources 305 other than the non-preferred resources 305-*a*.

In further examples, a first UE 115 may transmit a message (e.g., an IUC message) indicating resource information 310-*b*, which may include one or more preferred resources 305-*b*, to a second UE 115. The second UE 115 may perform operations based on the preferred resources 305-*b*. For example, the second UE 115 may perform a CBR measurement using the preferred resources 305-*b*. In another example, the second UE 115 may perform sidelink communication with the UE 115 using the preferred resources 305-*b*.

Figure 4:
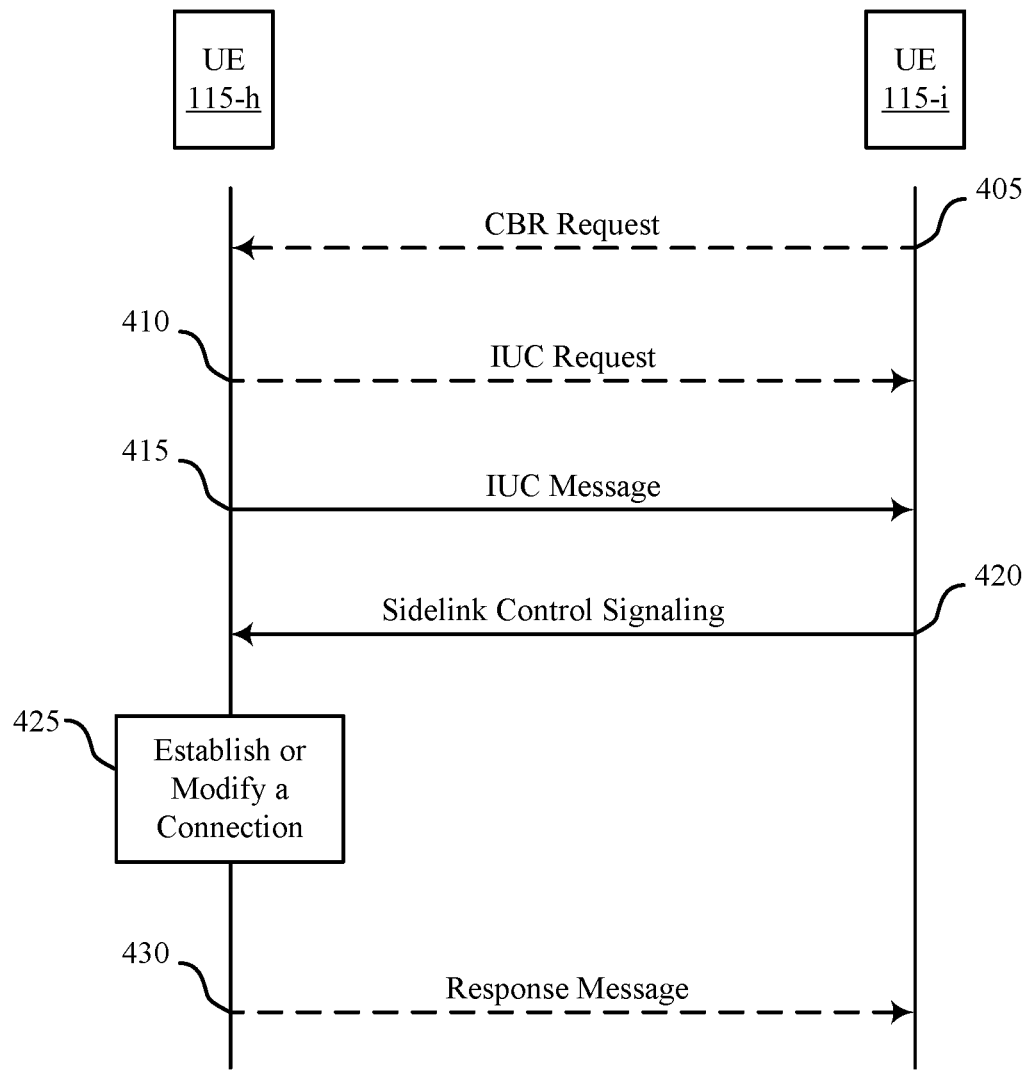
FIG. 4 illustrates an example of a process flow that supports IUC for resource management in accordance with one or more aspects of the present disclosure.

FIG. 4 illustrates an example of a process flow 400 that supports IUC for resource management in accordance with one or more aspects of the present disclosure. The process flow 400 may be implemented in a wireless communications system 100 or a wireless communications system 200 as described herein, with reference to FIGS. 1 and 2. The process flow 400 illustrates communications between a UE 115-*h* and a UE 115-*i*, which may be examples of UEs 115 as described herein, with reference to FIGS. 1-3. In the following description of the process flow 400, the operations performed by the devices may be performed in different orders or at different times. Additionally, or alternatively, some operations may be omitted from the process flow 400, and other operations may be added to the process flow 400.

At 405, the UE 115-*i* may transmit a request for a CBR measurement to the UE 115-*h*. The request for the CBR measurement may indicate a TCI state, a spatial relation, a spatial domain filter, one or more beams, or any combination thereof, for the UE 115-*i* to use in performing the CBR measurement. In some examples, the request for the CBR measurement may be transmitted in an IUC message.

At 410, the UE 115-*h* may transmit a IUC request to the UE 115-*i*. In some examples, the IUC request may indicate or request the UE 115-*i* to provide one or more preferred resources associated with receiving a response message (e.g., a BFR or RACH response) from the UE 115-*h*. Additionally, or alternatively, the IUC request may indicate or request the UE 115-*i* to provide one or more non-preferred resources associated with receiving the response message from the UE 115-*h*. In some examples, the IUC request may be an example of an IUC message.

At 415, the UE 115-*h* may transmit, on each respective beam of one or more beams supported by the UE 115-*h*, a IUC message to the UE 115-*i*. Each IUC message may indicate the UE 115-*i* of a set preferred resources of the UE 115-*h* associated with the respective beam. Additionally, or alternatively, the IUC message may indicate the UE 115-*i* of a set non-preferred resources of the UE 115-*h* associated with the respective beam. The preferred resources or non-preferred resources may be associated with a RACH procedure or a BFR procedure. For example, the UE 115-*i* may determine resources for transmitting a RACH signal or a BFR signal based on the preferred resources or the non-preferred resources. In some examples, the IUC request may be transmitted as part of the IUC message. In some cases, the UE 115-*h* may transmit the IUC message based on a request for the IUC message received from the UE 115-*i*. The UE 115-*h* may transmit the IUC message in accordance with a spatial filter. In some examples, the IUC message may be or include synchronization information associated with the UE 115-*h*, system information associated with the UE 115-*h*, or both.

In some examples, such as when the UE 115-*h* received a request for a CBR measurement from the UE 115-*h*, the IUC message may include an indication of the CBR measurement. The CBR measurement may be based on the request for the CBR measurement. For example, the CBR measurement may be performed by the UE 115-*h* based on a TCI state, a spatial relation, a spatial domain filter, one or more beams, or any combination thereof, as indicated in the request for the CBR measurement. In some examples, the CBR measurement may be associated with the one or more beams supported by the UE 115-*h*.

At 420, the UE 115-*i* may transmit sidelink control signaling to the UE 115-*h* in accordance with the indicated set preferred resources or the indicated set non-preferred resources. For example, the UE 115-*i* may transmit the sidelink control signaling using one or more of the resources indicated in the set preferred resources. Additionally, or alternatively, the UE 115-*i* may transmit the sidelink control signaling using one or more resources other than the resources indicated in the set of non-preferred resources. The sidelink control signaling may be an example of a BFR signal or a RACH signal. In some cases, such as when the UE 115-*i* received an IUC request from the UE 115-*h*, the sidelink control signaling may include an indication of a second set of preferred resources or non-preferred resources for the UE 115-*i* to receive a response to the sidelink control signaling. The UE 115-*i* may transmit the sidelink control signaling in accordance with the spatial filter used by the UE 115-*i* to receive the IUC message 415 from the UE 115-*h*. In some examples, the UE 115-*i* may adjust a transmission bandwidth based on a received indication of a CBR measurement.

At 425, the UE 115-*h* may establish or modify a connection based on the received sidelink control signaling. For example, the UE 115-*h* may establish or modify the connection based on the RACH procedure or the BFR procedure. In some cases, the UE 115-*h* may establish or modify the connection based on the received indication of the second set of preferred resources or non-preferred resources.

At 430, the UE 115-*h* may transmit a response message to the UE 115-*i*. In some examples, the response message may be a BFR response message or a RACH response message. The UE 115-*h* may transmit the response message according to the second set of preferred resources or non-preferred resources. For example, the UE 115-*h* may transmit the sidelink control signaling using one or more of the resources indicated in the second set preferred resources. Additionally, or alternatively, the UE 115-*h* may transmit the sidelink control signaling using one or more resources other than the resources indicated in the second set of non-preferred resources.

FIG. 5 shows a block diagram 500 of a device 505 that supports IUC for resource management in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to IUC for resource management). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to IUC for resource management). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of IUC for resource management as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first UE in accordance with examples as disclosed herein. For example, the communications manager 520 may be configured as or otherwise support a means for transmitting, on each respective beam of one or more beams supported by the first UE, an IUC message indicating a set of preferred resources associated with that beam for receiving sidelink control signaling associated with a random access procedure or a BFR procedure. The communications manager 520 may be configured as or otherwise support a means for receiving, on a beam of the one or more beams, the sidelink control signaling from a second UE in accordance with the set of preferred resources associated with the beam. The communications manager 520 may be configured as or otherwise support a means for establishing or modifying, based on the sidelink control signaling, a connection between the first UE and the second UE in accordance with the random access procedure or the BFR procedure.

Additionally, or alternatively, the communications manager 520 may support wireless communication at a first UE in accordance with examples as disclosed herein. For example, the communications manager 520 may be configured as or otherwise support a means for transmitting, on a beam supported by the first UE, an IUC message indicating a CBR measurement and a set of preferred resources associated with that beam for receiving sidelink signaling. The communications manager 520 may be configured as or otherwise support a means for receiving, on a beam of the one or more beams, the sidelink signaling from a second UE in accordance with the set of preferred resources associated with the beam.

Additionally, or alternatively, the communications manager 520 may support wireless communication a second UE in accordance with examples as disclosed herein. For example, the communications manager 520 may be configured as or otherwise support a means for receiving, on a beam for transmitting sidelink control signaling associated with a random access procedure or a BFR procedure, an IUC message indicating a set of preferred resources associated with the beam. The communications manager 520 may be configured as or otherwise support a means for transmitting, on the beam, the sidelink control signaling to a first UE in accordance with the set of preferred resources associated with the beam. The communications manager 520 may be configured as or otherwise support a means for establishing or modifying a connection between the first UE and the second UE based on the sidelink control signaling.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for IUC for resource management that may result in more efficient utilization of communication resources.

FIG. 6 shows a block diagram 600 of a device 605 that supports IUC for resource management in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to IUC for resource management). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to IUC for resource management). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of IUC for resource management as described herein. For example, the communications manager 620 may include an IUC message component 625, a sidelink control component 630, a sidelink connection manager 635, a CBR component 640, a preferred resource manager 645, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first UE in accordance with examples as disclosed herein. The IUC message component 625 may be configured as or otherwise support a means for transmitting, on each respective beam of one or more beams supported by the first UE, an IUC message indicating a set of preferred resources associated with that beam for receiving sidelink control signaling associated with a random access procedure or a BFR procedure. The sidelink control component 630 may be configured as or otherwise support a means for receiving, on a beam of the one or more beams, the sidelink control signaling from a second UE in accordance with the set of preferred resources associated with the beam. The sidelink connection manager 635 may be configured as or otherwise support a means for establishing or modifying, based on the sidelink control signaling, a connection between the first UE and the second UE in accordance with the random access procedure or the BFR procedure.

Additionally, or alternatively, the communications manager 620 may support wireless communication at a first UE in accordance with examples as disclosed herein. The CBR component 640 may be configured as or otherwise support a means for transmitting, on a beam supported by the first UE, an IUC message indicating a CBR measurement and a set of preferred resources associated with that beam for receiving sidelink signaling. The sidelink connection manager 635 may be configured as or otherwise support a means for receiving, on a beam of the one or more beams, the sidelink signaling from a second UE in accordance with the set of preferred resources associated with the beam.

Additionally, or alternatively, the communications manager 620 may support wireless communication a second UE in accordance with examples as disclosed herein. The preferred resource manager 645 may be configured as or otherwise support a means for receiving, on a beam for transmitting sidelink control signaling associated with a random access procedure or a BFR procedure, an IUC message indicating a set of preferred resources associated with the beam. The sidelink control component 630 may be configured as or otherwise support a means for transmitting, on the beam, the sidelink control signaling to a first UE in accordance with the set of preferred resources associated with the beam. The sidelink connection manager 635 may be configured as or otherwise support a means for establishing or modifying a connection between the first UE and the second UE based on the sidelink control signaling.

FIG. 7 shows a block diagram 700 of a communications manager 720 that supports IUC for resource management in accordance with one or more aspects of the present disclosure. The communications manager 720 may be an example of aspects of a communications manager 520, a communications manager 620, or both, as described herein. The communications manager 720, or various components thereof, may be an example of means for performing various aspects of IUC for resource management as described herein. For example, the communications manager 720 may include an IUC message component 725, a sidelink control component 730, a sidelink connection manager 735, a CBR component 740, a preferred resource manager 745, an BFR manager 750, an IUC request manager 755, a CBR request manager 760, a scheduling manager 765, a synchronization manager 770, or any combination thereof. Each of these components may communicate, directly or indirectly, with one another (e.g., via one or more buses).

The communications manager 720 may support wireless communication at a first UE in accordance with examples as disclosed herein. The IUC message component 725 may be configured as or otherwise support a means for transmitting, on each respective beam of one or more beams supported by the first UE, an IUC message indicating a set of preferred resources associated with that beam for receiving sidelink control signaling associated with a random access procedure or a BFR procedure. The sidelink control component 730 may be configured as or otherwise support a means for receiving, on a beam of the one or more beams, the sidelink control signaling from a second UE in accordance with the set of preferred resources associated with the beam. The sidelink connection manager 735 may be configured as or otherwise support a means for establishing or modifying, based on the sidelink control signaling, a connection between the first UE and the second UE in accordance with the random access procedure or the BFR procedure.

In some examples, to support transmitting the IUC message, the IUC message component 725 may be configured as or otherwise support a means for transmitting an IUC request indicating or requesting the second UE to provide one or more preferred resources of a second set of preferred resources for receiving a response to the sidelink control signaling.

In some examples, the sidelink control component 730 may be configured as or otherwise support a means for receiving, in response to the IUC request, an indication of the one or more preferred resources of the second set of preferred resources, where the sidelink control signaling includes the indication. In some examples, the BFR manager 750 may be configured as or otherwise support a means for transmitting the response to the sidelink control signaling in accordance with the one or more preferred resources of the second set of preferred resources.

In some examples, to support establishing or modifying the connection, the BFR manager 750 may be configured as or otherwise support a means for transmitting, in response to the sidelink control signaling, a BFR response associated with the BFR procedure or a random access response associated with the random access procedure, where the sidelink control signaling includes a BFR signal or a random access signal.

In some examples, the IUC request manager 755 may be configured as or otherwise support a means for receiving a request for the IUC message, where transmitting the IUC message is in response to the request.

In some examples, the sidelink control component 730 may be configured as or otherwise support a means for receiving, from one or more UEs, sidelink control information indicating scheduling information for the one or more UEs, where the IUC message indicates an updated set of preferred resources based on the scheduling information for the one or more UEs.

In some examples, the IUC message is transmitted to the second UE on the beam in accordance with a spatial filter. In some examples, receiving the sidelink control signaling is in accordance with the spatial filter.

In some examples, to support transmitting the IUC message, the IUC message component 725 may be configured as or otherwise support a means for transmitting, on each respective beam of the set of multiple beams supported by the first UE, synchronization information associated with the first UE, system information associated with the first UE, or both.

Additionally, or alternatively, the communications manager 720 may support wireless communication at a first UE in accordance with examples as disclosed herein. The CBR component 740 may be configured as or otherwise support a means for transmitting, on a beam supported by the first UE, an IUC message indicating a CBR measurement and a set of preferred resources associated with that beam for receiving sidelink signaling. In some examples, the sidelink connection manager 735 may be configured as or otherwise support a means for receiving, on a beam of the one or more beams, the sidelink signaling from a second UE in accordance with the set of preferred resources associated with the beam.

In some examples, the sidelink signaling is associated with a random access procedure or a BFR procedure. In some examples, the CBR measurement is associated with the one or more beams.

In some examples, the CBR request manager 760 may be configured as or otherwise support a means for receiving a request for the CBR measurement, where transmitting the CBR measurement is based on the request. In some examples, the request for the CBR measurement indicates a TCI state for the one or more beams, a spatial relation for the one or more beams, a spatial domain filter for the one or more beams, the one or more beams, or any combination thereof.

In some examples, the IUC request manager 755 may be configured as or otherwise support a means for receiving a request for the IUC message, where transmitting the CBR measurement is based on the request. In some examples, the CBR component 740 may be configured as or otherwise support a means for receiving a data transmission based on one or more transmission parameters corresponding to the CBR measurement. In some examples, the CBR component 740 may be configured as or otherwise support a means for performing the CBR measurement based on the set of preferred resources.

Additionally, or alternatively, the communications manager 720 may support wireless communication a second UE in accordance with examples as disclosed herein. The preferred resource manager 745 may be configured as or otherwise support a means for receiving, on a beam for transmitting sidelink control signaling associated with a random access procedure or a BFR procedure, an IUC message indicating a set of preferred resources associated with the beam. In some examples, the sidelink control component 730 may be configured as or otherwise support a means for transmitting, on the beam, the sidelink control signaling to a first UE in accordance with the set of preferred resources associated with the beam. In some examples, the sidelink connection manager 735 may be configured as or otherwise support a means for establishing or modifying a connection between the first UE and the second UE based on the sidelink control signaling.

In some examples, to support receiving the IUC message, the preferred resource manager 745 may be configured as or otherwise support a means for receiving an IUC request indicating or requesting the second UE to provide one or more preferred resources of a second set of preferred resources for receiving a response to the sidelink control signaling.

In some examples, the preferred resource manager 745 may be configured as or otherwise support a means for transmitting, in response to the IUC request, an indication of the one or more preferred resources of the second set of preferred resources, where the sidelink control signaling includes the indication. In some examples, the sidelink control component 730 may be configured as or otherwise support a means for receiving the response to the sidelink control signaling in accordance with the one or more preferred resources of the second set of preferred resources.

In some examples, to support establishing or modifying the connection, the BFR manager 750 may be configured as or otherwise support a means for receiving, in response to the sidelink control signaling, a BFR response associated with the BFR procedure or a random access response associated with the random access procedure, where the sidelink control signaling includes a BFR signal or a random access signal.

In some examples, the IUC request manager 755 may be configured as or otherwise support a means for transmitting a request for the IUC message, where receiving the IUC message is in response to the request.

In some examples, the scheduling manager 765 may be configured as or otherwise support a means for transmitting, to the first UE, sidelink control information indicating scheduling information for the first UE, where the IUC message indicates an updated set of preferred resources based on the scheduling information for the first UE.

In some examples, the IUC message is received from the first UE on the beam in accordance with a spatial filter. In some examples, transmitting the sidelink control signaling is in accordance with the spatial filter.

In some examples, to support receiving the IUC message, the synchronization manager 770 may be configured as or otherwise support a means for receiving, on the beam, synchronization information associated with the first UE, system information associated with the first UE, or both.

In some examples, to support receiving the IUC message, the CBR component 740 may be configured as or otherwise support a means for receiving, on the beam, a CBR measurement associated with the beam.

In some examples, the CBR request manager 760 may be configured as or otherwise support a means for transmitting, for the beam, a request for the CBR measurement, where receiving the CBR measurement is based on the request. In some examples, the request for the CBR measurement indicates a TCI state for the beam, a spatial relation for the beam, a spatial domain filter for the beam, the beam, or any combination thereof.

In some examples, the IUC request manager 755 may be configured as or otherwise support a means for transmitting a request for the IUC message, where receiving the CBR measurement is based on the request.

In some examples, the CBR component 740 may be configured as or otherwise support a means for transmitting, on the beam, a data transmission based on one or more transmission parameters corresponding to the CBR measurement.

FIG. 8 shows a diagram of a system 800 including a device 805 that supports IUC for resource management in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting IUC for resource management). For example, the device 805 or a component of the device 805 may include a processor 840 and memory 830 coupled with or to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for transmitting, on each respective beam of one or more beams supported by the first UE, an IUC message indicating a set of preferred resources associated with that beam for receiving sidelink control signaling associated with a random access procedure or a BFR procedure. The communications manager 820 may be configured as or otherwise support a means for receiving, on a beam of the one or more beams, the sidelink control signaling from a second UE in accordance with the set of preferred resources associated with the beam. The communications manager 820 may be configured as or otherwise support a means for establishing or modifying, based on the sidelink control signaling, a connection between the first UE and the second UE in accordance with the random access procedure or the BFR procedure.

Additionally, or alternatively, the communications manager 820 may support wireless communication at a first UE in accordance with examples as disclosed herein. For example, the communications manager 820 may be configured as or otherwise support a means for transmitting, on a beam supported by the first UE, an IUC message indicating a CBR measurement and a set of preferred resources associated with that beam for receiving sidelink signaling. The communications manager 820 may be configured as or otherwise support a means for receiving, on a beam of the one or more beams, the sidelink signaling from a second UE in accordance with the set of preferred resources associated with the beam.

Additionally, or alternatively, the communications manager 820 may support wireless communication a second UE in accordance with examples as disclosed herein. For example, the communications manager 820 may be configured as or otherwise support a means for receiving, on a beam for transmitting sidelink control signaling associated with a random access procedure or a BFR procedure, an IUC message indicating a set of preferred resources associated with the beam. The communications manager 820 may be configured as or otherwise support a means for transmitting, on the beam, the sidelink control signaling to a first UE in accordance with the set of preferred resources associated with the beam. The communications manager 820 may be configured as or otherwise support a means for establishing or modifying a connection between the first UE and the second UE based on the sidelink control signaling.

By including or configuring the communications manager 820 in accordance with examples as described herein, the device 805 may support techniques for IUC for resource management that may result in improved communication reliability, improved coordination between devices, and improved user experience related to improved reliability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of IUC for resource management as described herein, or the processor 840 and the memory 830 may be otherwise configured to perform or support such operations.

FIG. 9 shows a flowchart illustrating a method 900 that supports IUC for resource management in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include transmitting, on each respective beam of one or more beams supported by the first UE, an IUC message indicating a set of preferred resources associated with that beam for receiving sidelink control signaling associated with a random access procedure or a BFR procedure. The operations of 905 may be performed in accordance with examples as disclosed herein. In some examples, aspects of the operations of 905 may be performed by an IUC message component 725 as described with reference to FIG. 7.

At 910, the method may include receiving, on a beam of the one or more beams, the sidelink control signaling from a second UE in accordance with the set of preferred resources associated with the beam. The operations of 910 may be performed in accordance with examples as disclosed herein. In some examples, aspects of the operations of 910 may be performed by a sidelink control component 730 as described with reference to FIG. 7.

At 915, the method may include establishing or modifying, based on the sidelink control signaling, a connection between the first UE and the second UE in accordance with the random access procedure or the BFR procedure. The operations of 915 may be performed in accordance with examples as disclosed herein. In some examples, aspects of the operations of 915 may be performed by a sidelink connection manager 735 as described with reference to FIG. 7.

FIG. 10 shows a flowchart illustrating a method 1000 that supports IUC for resource management in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include transmitting, on each respective beam of one or more beams supported by the first UE, an IUC message indicating a set of preferred resources associated with that beam for receiving sidelink control signaling associated with a random access procedure or a BFR procedure. The operations of 1005 may be performed in accordance with examples as disclosed herein. In some examples, aspects of the operations of 1005 may be performed by an IUC message component 725 as described with reference to FIG. 7.

At 1010, the method may include transmitting an IUC request indicating to the second UE to provide one or more preferred resources for receiving a response to the sidelink control signaling. The operations of 1010 may be performed in accordance with examples as disclosed herein. In some examples, aspects of the operations of 1010 may be performed by an IUC message component 725 as described with reference to FIG. 7.

At 1015, the method may include receiving, on a beam of the one or more beams, the sidelink control signaling from a second UE in accordance with the set of preferred resources associated with the beam. The operations of 1015 may be performed in accordance with examples as disclosed herein. In some examples, aspects of the operations of 1015 may be performed by a sidelink control component 730 as described with reference to FIG. 7.

At 1020, the method may include receiving, in response to the IUC request, an indication of the one or more preferred resources of the second set of preferred resources, where the sidelink control signaling includes the indication. The operations of 1020 may be performed in accordance with examples as disclosed herein. In some examples, aspects of the operations of 1020 may be performed by a sidelink control component 730 as described with reference to FIG. 7.

At 1025, the method may include establishing or modifying, based on the sidelink control signaling, a connection between the first UE and the second UE in accordance with the random access procedure or the BFR procedure. The operations of 1025 may be performed in accordance with examples as disclosed herein. In some examples, aspects of the operations of 1025 may be performed by a sidelink connection manager 735 as described with reference to FIG. 7.

At 1030, the method may include transmitting the response to the sidelink control signaling in accordance with the one or more preferred resources. The operations of 1030 may be performed in accordance with examples as disclosed herein. In some examples, aspects of the operations of 1030 may be performed by an BFR manager 750 as described with reference to FIG. 7.

FIG. 11 shows a flowchart illustrating a method 1100 that supports IUC for resource management in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include transmitting, on a beam supported by the first UE, an IUC message indicating a CBR measurement and a set of preferred resources associated with that beam for receiving sidelink signaling. The operations of 1105 may be performed in accordance with examples as disclosed herein. In some examples, aspects of the operations of 1105 may be performed by a CBR component 740 as described with reference to FIG. 7.

At 1110, the method may include receiving, on a beam of the one or more beams, the sidelink signaling from a second UE in accordance with the set of preferred resources associated with the beam. The operations of 1110 may be performed in accordance with examples as disclosed herein. In some examples, aspects of the operations of 1110 may be performed by a sidelink connection manager 735 as described with reference to FIG. 7.

FIG. 12 shows a flowchart illustrating a method 1200 that supports IUC for resource management in accordance with one or more aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1205, the method may include receiving, on a beam for transmitting sidelink control signaling associated with a random access procedure or a BFR procedure, an IUC message indicating a set of preferred resources associated with the beam. The operations of 1205 may be performed in accordance with examples as disclosed herein. In some examples, aspects of the operations of 1205 may be performed by a preferred resource manager 745 as described with reference to FIG. 7.

At 1210, the method may include transmitting, on the beam, the sidelink control signaling to a first UE in accordance with the set of preferred resources associated with the beam. The operations of 1210 may be performed in accordance with examples as disclosed herein. In some examples, aspects of the operations of 1210 may be performed by a sidelink control component 730 as described with reference to FIG. 7.

At 1215, the method may include establishing or modifying a connection between the first UE and the second UE based on the sidelink control signaling. The operations of 1215 may be performed in accordance with examples as disclosed herein. In some examples, aspects of the operations of 1215 may be performed by a sidelink connection manager 735 as described with reference to FIG. 7.

The following provides an overview of aspects of the present disclosure:

Aspect 1: A method for wireless communication at a first UE, comprising: transmitting, on each respective beam of one or more beams supported by the first UE, an inter-UE coordination message indicating a set of preferred resources associated with that beam for receiving sidelink control signaling associated with a random access procedure or a beam failure recovery procedure; receiving, on a beam of the one or more beams, the sidelink control signaling from a second UE in accordance with the set of preferred resources associated with the beam; and establishing or modifying, based at least in part on the sidelink control signaling, a connection between the first UE and the second UE in accordance with the random access procedure or the beam failure recovery procedure.

Aspect 2: The method of aspect 1, wherein transmitting the inter-UE coordination message comprises: transmitting an inter-UE coordination request indicating to the second UE to provide one or more preferred resources of a second set of preferred resources for receiving a response to the sidelink control signaling.

Aspect 3: The method of aspect 2, further comprising: receiving, in response to the inter-UE coordination request, an indication of the one or more preferred resources of the second set of preferred resources, wherein the sidelink control signaling comprises the indication; and transmitting the response to the sidelink control signaling in accordance with the one or more preferred resources of the second set of preferred resources.

Aspect 4: The method of any of aspects 1 through 3, wherein establishing or modifying the connection comprises: transmitting, in response to the sidelink control signaling, a beam failure recovery response associated with the beam failure recovery procedure or a random access response associated with the random access procedure, wherein the sidelink control signaling comprises a beam failure recovery signal or a random access signal.

Aspect 5: The method of any of aspects 1 through 4, further comprising: receiving a request for the inter-UE coordination message, wherein transmitting the inter-UE coordination message is in response to the request.

Aspect 6: The method of any of aspects 1 through 5, further comprising: receiving, from one or more UEs, sidelink control information indicating scheduling information for the one or more UEs, wherein the inter-UE coordination message indicates an updated set of preferred resources based at least in part on the scheduling information for the one or more UEs.

Aspect 7: The method of any of aspects 1 through 6, wherein the inter-UE coordination message is transmitted to the second UE on the beam in accordance with a spatial filter, receiving the sidelink control signaling is in accordance with the spatial filter.

Aspect 8: The method of any of aspects 1 through 7, wherein transmitting the inter-UE coordination message comprises: transmitting, on each respective beam of the plurality of beams supported by the first UE, synchronization information associated with the first UE, system information associated with the first UE, or both.

Aspect 9: A method for wireless communication at a first UE, comprising: transmitting, on a beam supported by the first UE, an inter-UE coordination message indicating a channel busy ratio measurement and a set of preferred resources associated with that beam for receiving sidelink signaling; and receiving, on a beam of the one or more beams, the sidelink signaling from a second UE in accordance with the set of preferred resources associated with the beam.

Aspect 10: The method of aspect 9, wherein the sidelink signaling is associated with a random access procedure or a beam failure recovery procedure.

Aspect 11: The method of any of aspects 9 through 10, wherein the channel busy ratio measurement is associated with the one or more beams.

Aspect 12: The method of any of aspects 9 through 11, further comprising: receiving a request for the channel busy ratio measurement, wherein transmitting the channel busy ratio measurement is based at least in part on the request.

Aspect 13: The method of aspect 12, wherein the request for the channel busy ratio measurement indicates a transmission configuration indicator state for the one or more beams, a spatial relation for the one or more beams, a spatial domain filter for the one or more beams, the one or more beams, or any combination thereof.

Aspect 14: The method of any of aspects 9 through 13, further comprising: receiving a request for the inter-UE coordination message, wherein transmitting the channel busy ratio measurement is based at least in part on the request.

Aspect 15: The method of any of aspects 9 through 14, further comprising: receiving a data transmission based at least in part on one or more transmission parameters corresponding to the channel busy ratio measurement.

Aspect 16: The method of any of aspects 9 through 15, further comprising: performing the channel busy ratio measurement based at least in part on the set of preferred resources.

Aspect 17: A method for wireless communication a second UE, comprising: receiving, on a beam for transmitting sidelink control signaling associated with a random access procedure or a beam failure recovery procedure, an inter-UE coordination message indicating a set of preferred resources associated with the beam; transmitting, on the beam, the sidelink control signaling to a first UE in accordance with the set of preferred resources associated with the beam; and establishing or modifying a connection between the first UE and the second UE based at least in part on the sidelink control signaling.

Aspect 18: The method of aspect 17, wherein receiving the inter-UE coordination message comprises: receiving an inter-UE coordination request indicating to the second UE to provide one or more preferred resources of a second set of preferred resources for receiving a response to the sidelink control signaling.

Aspect 19: The method of aspect 18, further comprising: transmitting, in response to the inter-UE coordination request, an indication of the one or more preferred resources of the second set of preferred resources, wherein the sidelink control signaling comprises the indication; and receiving the response to the sidelink control signaling in accordance with the one or more preferred resources of the second set of preferred resources.

Aspect 20: The method of any of aspects 17 through 19, wherein establishing or modifying the connection comprises: receiving, in response to the sidelink control signaling, a beam failure recovery response associated with the beam failure recovery procedure or a random access response associated with the random access procedure, wherein the sidelink control signaling comprises a beam failure recovery signal or a random access signal.

Aspect 21: The method of any of aspects 17 through 20, further comprising: transmitting a request for the inter-UE coordination message, wherein receiving the inter-UE coordination message is in response to the request.

Aspect 22: The method of any of aspects 17 through 21, further comprising: transmitting, to the first UE, sidelink control information indicating scheduling information for the first UE, wherein the inter-UE coordination message indicates an updated set of preferred resources based at least in part on the scheduling information for the first UE.

Aspect 23: The method of any of aspects 17 through 22, wherein the inter-UE coordination message is received from the first UE on the beam in accordance with a spatial filter, transmitting the sidelink control signaling is in accordance with the spatial filter.

Aspect 24: The method of any of aspects 17 through 23, wherein receiving the inter-UE coordination message comprises: receiving, on the beam, synchronization information associated with the first UE, system information associated with the first UE, or both.

Aspect 25: The method of any of aspects 17 through 24, wherein receiving the inter-UE coordination message comprises: receiving, on the beam, a channel busy ratio measurement associated with the beam.

Aspect 26: The method of aspect 25, further comprising: transmitting, for the beam, a request for the channel busy ratio measurement, wherein receiving the channel busy ratio measurement is based at least in part on the request.

Aspect 27: The method of aspect 26, wherein the request for the channel busy ratio measurement indicates a transmission configuration indicator state for the beam, a spatial relation for the beam, a spatial domain filter for the beam, the beam, or any combination thereof.

Aspect 28: The method of any of aspects 25 through 27, further comprising: transmitting a request for the inter- UE coordination message, wherein receiving the channel busy ratio measurement is based at least in part on the request.

Aspect 29: The method of any of aspects 25 through 28, further comprising: transmitting, on the beam, a data transmission based at least in part on one or more transmission parameters corresponding to the channel busy ratio measurement.

Aspect 30: An apparatus for wireless communication at a first UE, comprising a processor; memory coupled with the processor; and instructions stored in the memory and executable by the processor to cause the apparatus to perform a method of any of aspects 1 through 8.

Aspect 31: An apparatus for wireless communication at a first UE, comprising at least one means for performing a method of any of aspects 1 through 8.

Aspect 32: A non-transitory computer-readable medium storing code for wireless communication at a first UE, the code comprising instructions executable by a processor to perform a method of any of aspects 1 through 8.

Aspect 33: An apparatus for wireless communication at a first UE, comprising a processor; memory coupled with the processor; and instructions stored in the memory and executable by the processor to cause the apparatus to perform a method of any of aspects 9 through 16.

Aspect 34: An apparatus for wireless communication at a first UE, comprising at least one means for performing a method of any of aspects 9 through 16.

Aspect 35: A non-transitory computer-readable medium storing code for wireless communication at a first UE, the code comprising instructions executable by a processor to perform a method of any of aspects 9 through 16.

Aspect 36: An apparatus for wireless communication a second UE, comprising a processor; memory coupled with the processor; and instructions stored in the memory and executable by the processor to cause the apparatus to perform a method of any of aspects 17 through 29.

Aspect 37: An apparatus for wireless communication a second UE, comprising at least one means for performing a method of any of aspects 17 through 29.

Aspect 38: A non-transitory computer-readable medium storing code for wireless communication a second UE, the code comprising instructions executable by a processor to perform a method of any of aspects 17 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

As used herein, the phrase "a set" shall be constructed as including the possibility of a set with one member. That is, the phrase a "a set" shall be construed in the same manner as "one or more."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
    one or more memories storing processor-executable code; and
    one or more processors coupled with the one or more memories and operable to execute the code to cause the apparatus to:
        transmit, on each beam of one or more beams supported by the first UE, a respective inter-UE coordination message, wherein the respective inter-UE coordination message for a beam of the one or more beams indicates a respective set of preferred resources for receiving, on that beam, sidelink control signaling associated with a random access procedure or a beam failure recovery procedure, and wherein the respective inter-UE coordination message comprises an inter-UE coordination request indicating to a second UE to provide one or more preferred resources of a second set of preferred resources for receiving a beam failure recovery response associated with the beam failure recovery procedure or a random access response associated with the random access procedure;

receive, on a first beam of the one or more beams, the sidelink control signaling from the second UE in accordance with the respective set of preferred resources indicated by the respective inter-UE coordination message for the first beam, wherein the sidelink control signaling comprises a beam failure recovery signal or a random access signal and further comprises an indication of the one or more preferred resources of the second set of preferred resources; and establish or modify, based at least in part on the sidelink control signaling, a connection between the first UE and the second UE in accordance with the random access procedure or the beam failure recovery procedure, wherein, to establish or modify the connection, the one or more processors are operable to execute the code to cause the apparatus to:

transmit, in response to the sidelink control signaling and in accordance with the one or more preferred resources of the second set of preferred resources, the beam failure recovery response associated with the beam failure recovery procedure or the random access response associated with the random access procedure.

2. The apparatus of claim 1, wherein the one or more processors are further operable to execute the code to cause the apparatus to:

receive a request for the one or more respective inter-UE coordination messages, wherein transmitting the one or more respective inter-UE coordination messages is in response to the request.

3. The apparatus of claim 1, wherein the one or more processors are further operable to execute the code to cause the apparatus to:

receive, from one or more UEs, sidelink control information indicating scheduling information for the one or more UEs, wherein the respective inter-UE coordination message for the first beam indicates an updated set of preferred resources for the first beam based at least in part on the scheduling information for the one or more UEs.

4. The apparatus of claim 1, wherein the respective inter-UE coordination message for the first beam is transmitted to the second UE on the first beam in accordance with a spatial filter and receiving the sidelink control signaling is in accordance with the spatial filter.

5. The apparatus of claim 1, wherein to transmit the one or more respective inter-UE coordination messages, the one or more processors are operable to execute the code to cause the apparatus to:

transmit, on each beam of the one or more beams supported by the first UE, synchronization information associated with the first UE, system information associated with the first UE, or both.

6. An apparatus for wireless communication at a first user equipment (UE), comprising:

one or more memories storing processor-executable code; and one or more processors coupled with the one or more memories and operable to execute the code to cause the apparatus to:

transmit, on a first beam of one or more beams supported by the first UE, an inter-UE coordination message indicating a channel busy ratio measurement and a set of preferred resources for receiving sidelink signaling on the first beam, wherein the inter-UE coordination message comprises an inter-UE coordination request indicating to a second UE to provide one or more preferred resources of a second set of preferred resources for receiving a beam failure recovery response associated with a beam failure recovery procedure or a random access response associated with a random access procedure;

receive, on the first beam, the sidelink signaling from the second UE in accordance with the set of preferred resources indicated for the first beam by the inter-UE coordination message, wherein the sidelink signaling comprises a beam failure recovery signal or a random access signal and further comprises an indication of the one or more preferred resources of the second set of preferred resources; and transmit, in response to the sidelink signaling and in accordance with the one or more preferred resources of the second set of preferred resources, the random access response associated with the random access procedure or the beam failure recovery response associated with the beam failure recovery procedure.

7. The apparatus of claim 6, wherein the channel busy ratio measurement is associated with the one or more beams.

8. The apparatus of claim 6, wherein the one or more processors are further operable to execute the code to cause the apparatus to:

receive a request for the channel busy ratio measurement, wherein transmitting the channel busy ratio measurement is based at least in part on the request.

9. The apparatus of claim 8, wherein the request for the channel busy ratio measurement indicates a transmission configuration indicator state for the one or more beams, a spatial relation for the one or more beams, a spatial domain filter for the one or more beams, the one or more beams, or any combination thereof.

10. The apparatus of claim 6, wherein the one or more processors are further operable to execute the code to cause the apparatus to:

receive a request for the inter-UE coordination message, wherein transmitting the channel busy ratio measurement is based at least in part on the request.

11. The apparatus of claim 6, wherein the one or more processors are further operable to execute the code to cause the apparatus to:

receive a data transmission based at least in part on one or more transmission parameters corresponding to the channel busy ratio measurement.

12. The apparatus of claim 6, wherein the one or more processors are further operable to execute the code to cause the apparatus to:

perform the channel busy ratio measurement based at least in part on the set of preferred resources.

13. An apparatus for wireless communication a second user equipment (UE), comprising:

one or more memories storing processor-executable code; and one or more processors coupled with the one or more memories and operable to execute the code to cause the apparatus to:

receive, on a beam, an inter-UE coordination message indicating a set of preferred resources for reception, on the beam, by a first UE of sidelink control signaling associated with a random access procedure or a beam failure recovery procedure, and wherein the inter-UE coordination message comprises an inter-UE coordination request indicating to the second UE to provide one or more preferred resources of a second set of preferred resources for receiving a beam failure recovery response associated with the beam failure recovery procedure or a random access response associated with the random access procedure;

transmit, on the beam, the sidelink control signaling to the first UE in accordance with the set of preferred resources indicated for the beam by the inter-UE coordination message, wherein the sidelink control signaling comprises a beam failure recovery signal or a random access signal and further comprises an indication of the one or more preferred resources of the second set of preferred resources; and establish or modify a connection between the first UE and the second UE based at least in part on the sidelink control signaling, wherein, to establish or modify the connection, the one or more processors are operable to execute the code to cause the apparatus to:

receive, in response to the sidelink control signaling and in accordance with the one or more preferred resources of the second set of preferred resources, the beam failure recovery response associated with the beam failure recovery procedure or the random access response associated with the random access procedure.

14. The apparatus of claim 13, wherein the one or more processors are further operable to execute the code to cause the apparatus to:

transmit a request for the inter-UE coordination message, wherein receiving the inter-UE coordination message is in response to the request.

15. The apparatus of claim 13, wherein the one or more processors are further operable to execute the code to cause the apparatus to:

transmit, to the first UE, sidelink control information indicating scheduling information for the first UE, wherein the inter-UE coordination message indicates an updated set of preferred resources based at least in part on the scheduling information for the first UE.

16. The apparatus of claim 13, wherein the inter-UE coordination message is received from the first UE on the beam in accordance with a spatial filter and transmitting the sidelink control signaling is in accordance with the spatial filter.

17. The apparatus of claim 13, wherein, to receive the inter-UE coordination message, the one or more processors are operable to execute the code to cause the apparatus to:

receive, on the beam, synchronization information associated with the first UE, system information associated with the first UE, or both.

18. The apparatus of claim 13, wherein, to receive the inter-UE coordination message, the one or more processors are operable to execute the code to cause the apparatus to:

receive, on the beam, a channel busy ratio measurement associated with the beam.

19. The apparatus of claim 18, wherein the one or more processors are further operable to execute the code to cause the apparatus to:

transmit, for the beam, a request for the channel busy ratio measurement, wherein receiving the channel busy ratio measurement is based at least in part on the request.

20. The apparatus of claim 19, wherein the request for the channel busy ratio measurement indicates a transmission configuration indicator state for the beam, a spatial relation for the beam, a spatial domain filter for the beam, the beam, or any combination thereof.

21. The apparatus of claim 18, wherein the one or more processors are further operable to execute the code to cause the apparatus to:

transmit a request for the inter-UE coordination message, wherein receiving the channel busy ratio measurement is based at least in part on the request.

22. The apparatus of claim 18, wherein the one or more processors are further operable to execute the code to cause the apparatus to:

transmit, on the beam, a data transmission based at least in part on one or more transmission parameters corresponding to the channel busy ratio measurement.

23. A method for wireless communication at a first user equipment (UE), comprising:

transmitting, on each beam of one or more beams supported by the first UE, a respective inter-UE coordination message, wherein the respective inter-UE coordination message for a beam of the one or more beams indicates a respective set of preferred resources for receiving, on that beam, sidelink control signaling associated with a random access procedure or a beam failure recovery procedure, and wherein the respective inter-UE coordination message comprises an inter-UE coordination request indicating to a second UE to provide one or more preferred resources of a second set of preferred resources for receiving a beam failure recovery response associated with the beam failure recovery procedure or a random access response associated with the random access procedure;

receiving, on a first beam of the one or more beams, the sidelink control signaling from the second UE in accordance with the respective set of preferred resources indicated by the respective inter-UE coordination message for the first beam, wherein the sidelink control signaling comprises a beam failure recovery signal or a random access signal and further comprises an indication of the one or more preferred resources of the second set of preferred resources; and establishing or modifying, based at least in part on the sidelink control signaling, a connection between the first UE and the second UE in accordance with the random access procedure or the beam failure recovery procedure, wherein establishing or modifying the connection comprises:

transmitting, in response to the sidelink control signaling and in accordance with the one or more preferred resources of the second set of preferred resources, the beam failure recovery response associated with the beam failure recovery procedure or the random access response associated with the random access procedure.

24. A method for wireless communication at a first user equipment (UE), comprising:

transmitting, on a first beam of one or more beams supported by the first UE, an inter-UE coordination message indicating a channel busy ratio measurement and a set of preferred resources for receiving sidelink signaling on the first beam, wherein the inter-UE coordination message comprises an inter-UE coordination request indicating to a second UE to provide one or more preferred resources of a second set of preferred resources for receiving a beam failure recovery response associated with a beam failure recovery procedure or a random access response associated with a random access procedure;

receiving, on the first beam, the sidelink signaling from the second UE in accordance with the set of preferred resources indicated for the first beam by the inter-UE coordination message, wherein the sidelink signaling comprises a beam failure recovery signal or a random access signal and further comprises an indication of the one or more preferred resources of the second set of preferred resources; and transmitting, in response to the sidelink signaling and in accordance with the one or more preferred resources of the second set of preferred resources, the random access response associated with the random access procedure or a beam failure recovery response associated with a beam failure recovery procedure.

25. The method of claim 24, wherein the sidelink signaling is associated with a random access procedure or a beam failure recovery procedure.

26. The method of claim 24, wherein the channel busy ratio measurement is associated with the one or more beams.

27. The method of claim 24, further comprising:

receiving a request for the channel busy ratio measurement, wherein transmitting the channel busy ratio measurement is based at least in part on the request.

28. The method of claim 27, wherein the request for the channel busy ratio measurement indicates a transmission configuration indicator state for the one or more beams, a spatial relation for the one or more beams, a spatial domain filter for the one or more beams, the one or more beams, or any combination thereof.

29. A method for wireless communication a second user equipment (UE), comprising:

receiving, on a beam, an inter-UE coordination message indicating a set of preferred resources for reception, on the beam, by a first UE of sidelink control signaling associated with a random access procedure or a beam failure recovery procedure, and wherein the inter-UE coordination message comprises an inter-UE coordination request indicating to the second UE to provide one or more preferred resources of a second set of preferred resources for receiving a beam failure recovery response associated with the beam failure recovery procedure or a random access response associated with the random access procedure;

transmitting, on the beam, the sidelink control signaling to the first UE in accordance with the set of preferred resources indicated for the beam by the inter-UE coordination message, wherein the sidelink control signaling comprises a beam failure recovery signal or a random access signal and further comprises an indication of the one or more preferred resources of the second set of preferred resources; and establishing or modifying a connection between the first UE and the second UE based at least in part on the sidelink control signaling, wherein establishing or modifying the connection comprises:

receiving, in response to the sidelink control signaling and in accordance with the one or more preferred resources of the second set of preferred resources, the beam failure recovery response associated with the beam failure recovery procedure or the random access response associated with the random access procedure.

* * * * *